US007619041B2

(12) United States Patent
Yamamoto et al.

(10) Patent No.: US 7,619,041 B2
(45) Date of Patent: Nov. 17, 2009

(54) RESIN PARTICLES AND PRODUCING METHOD THEREOF, TONER FOR DEVELOPING ELECTROSTATIC LATENT IMAGE AND PRODUCING METHOD THEREOF, ELECTROSTATIC LATENT IMAGE DEVELOPER AS WELL AS IMAGE FORMING METHOD

(75) Inventors: Yasuo Yamamoto, Minamiashigara (JP); Satoshi Hiraoka, Minamiashigara (JP); Hideo Maehata, Minamiashigara (JP); Yasuo Matsumura, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 63 days.

(21) Appl. No.: 12/081,911

(22) Filed: Apr. 23, 2008

(65) Prior Publication Data

US 2008/0234439 A1 Sep. 25, 2008

Related U.S. Application Data

(62) Division of application No. 11/075,816, filed on Mar. 10, 2005, now Pat. No. 7,420,020.

(30) Foreign Application Priority Data

May 14, 2004 (JP) ............................ 2004-145415
May 14, 2004 (JP) ............................ 2004-145514
May 14, 2004 (JP) ............................ 2004-145515

(51) Int. Cl.
*C08L 71/00* (2006.01)

(52) U.S. Cl. ........................ 525/411; 525/418; 525/419

(58) Field of Classification Search ................. 525/411, 525/418, 419
See application file for complete search history.

(56) References Cited

U.S. PATENT DOCUMENTS

| | | | | |
|---|---|---|---|---|
| 3,557,255 | A | 1/1971 | Sharkey | |
| 3,884,994 | A * | 5/1975 | Critchfield et al. | 525/63 |
| 4,289,873 | A * | 9/1981 | Kubo et al. | 528/357 |
| 4,317,894 | A | 3/1982 | Lewarchik et al. | |
| 4,500,686 | A * | 2/1985 | Kobayashi et al. | 525/408 |
| 4,584,353 | A * | 4/1986 | Kobayashi et al. | 525/438 |
| 4,665,134 | A * | 5/1987 | Inoue et al. | 525/419 |
| 4,721,483 | A | 1/1988 | Dickie | |
| 4,826,934 | A | 5/1989 | Malfroid et al. | |
| 5,256,739 | A | 10/1993 | Ono et al. | |
| 5,382,624 | A * | 1/1995 | Hotta et al. | 525/10 |
| 5,472,818 | A * | 12/1995 | Hotta et al. | 430/110.1 |
| 5,591,786 | A | 1/1997 | Oxman et al. | |
| 5,696,178 | A | 12/1997 | Cooper et al. | |
| 5,696,212 | A * | 12/1997 | Isozaki | 525/529 |
| 5,744,560 | A | 4/1998 | Foucher et al. | |
| 5,869,582 | A * | 2/1999 | Tang et al. | 525/415 |
| 5,990,264 | A | 11/1999 | Drysdale et al. | |
| 6,166,151 | A * | 12/2000 | Hariharan et al. | 525/463 |
| 2005/0014980 | A1 | 1/2005 | Van Hal et al. | |
| 2005/0255398 | A1 | 11/2005 | Hiraoka et al. | |
| 2009/0198020 | A1 * | 8/2009 | Sakane | 525/411 |

FOREIGN PATENT DOCUMENTS

| | | |
|---|---|---|
| JP | B-42-023910 | 11/1967 |
| JP | A-51-061595 | 5/1974 |
| JP | A-62-087248 | 4/1987 |
| JP | A-62-291668 | 12/1987 |
| JP | A-03-188047 | 8/1991 |
| JP | A-04-288041 | 10/1992 |
| JP | 07-149878 | 6/1995 |
| JP | 08-44111 | 2/1996 |
| JP | 08-286416 | 11/1996 |
| JP | 09-269610 | 10/1997 |
| JP | A-10-026842 | 1/1998 |
| JP | 2826634 | 9/1998 |
| JP | A-11-024306 | 1/1999 |
| JP | 2001049092 A * | 2/2001 |
| JP | A-2001-265057 | 9/2001 |
| JP | 3348471 | 9/2002 |
| JP | A-2002-311639 | 10/2002 |
| JP | A-2002-311769 | 10/2002 |
| JP | A-2002-341587 | 11/2002 |
| JP | A-2003-107802 | 4/2003 |
| JP | A-2003-335727 | 11/2003 |

* cited by examiner

*Primary Examiner*—Bernard Lipman
(74) *Attorney, Agent, or Firm*—Oliff & Berridge, PLC

(57) ABSTRACT

A resin particle producing method that includes at least an emulsification step of emulsifying a composition containing at least a polymerizable monomer and a polymerization step to form droplets of the composition, and a polymerization step of polymerizing the polymerizable monomer in the droplets to synthesize resin particles, wherein the composition contains a polyester resin, lactone, and a lactone catalyst for polymerizing the lactone.

16 Claims, No Drawings

RESIN PARTICLES AND PRODUCING METHOD THEREOF, TONER FOR DEVELOPING ELECTROSTATIC LATENT IMAGE AND PRODUCING METHOD THEREOF, ELECTROSTATIC LATENT IMAGE DEVELOPER AS WELL AS IMAGE FORMING METHOD

CROSS-REFERENCE TO RELATED APPLICATION

This is a Division of application Ser. No. 11/075,816 filed Mar. 10, 2005, now U.S. Pat. No. 7,420,020. The disclosure of the prior application is hereby incorporated by reference herein in its entirety. This application claims priority under 35 U.S.C. § 19 from Japanese Patent Application Nos. 2004-145415, 2004-145514 and 2004-145515, the disclosures of which are incorporated by reference herein in their entirety.

BACKGROUND OF THE INVENTION

1. Field of the Invention

The present invention relates to resin particles and a producing method thereof, a toner for developing an electrostatic latent image and a producing method thereof, an electrostatic latent image developer as well as an image forming method.

2. Description of the Related Art

A method in which image information is made visible via an image of electrostatic charge as in electrophotography and the like is widely used currently in various fields. Electrophotography consists of forming an image of electrostatic charge on a photoreceptor through charging and exposure steps, developing the image of electrostatic charge with a developer containing toner particles, and making the developed image visible via transfer and fixation steps.

By the way, there are two types of known developer, a two-component developer which comprises toner particles and carrier particles, and a one-component developer which comprises either magnetic toner particles or non-magnetic toner particles. These toner particles are usually prepared by a kneading-pulverizing process. The kneading-pulverizing process comprises melting and kneading a thermoplastic resin with a pigment, a charge controller and a releasing agent such as a wax, pulverizing the resultant product after cooling, and classifying the pulverized product by size to obtain the desired toner. If necessary, for the purpose of improving such properties as fluidity and cleanability of the thus prepared toner particles, inorganic and/or organic particles are added to the surface to the toner particles.

Usually in the case of toner particles which are prepared by a kneading-pulverizing process, their shape is indeterminate and their surface composition is not uniform. Although the shape and the surface composition of toner particles are subtly changed depending on the grindability of the material used and conditions during the grinding process, it is difficult to control these aspects as intended to the desired extent. Particularly, in the case of toner particles which are prepared by the kneading-pulverizing process using a material having a high degree of grindability, further pulverization of the particles and change in their shape frequently occurs due to mechanical forces such as the various shear forces present in a developing machine.

As a result, in a two-component developer, a problem arises that finely-ground toner particles are adhered to a carrier surface and accelerate deterioration in charging of the developer. Also, in a one-component developer, particle size distribution is widened, finely-ground toner particles are scattered, developability is reduced accompanied by change in toner shape, and image quality is deteriorated.

In the case of toner particles having an indeterminate shape, there is a problem that even when a flow assistant is added, flowability is not sufficient. And due to mechanical force such as shear force during use, the fine particles of the flow assistant are moved to a concave portion of the toner particles and are embedded in the interior thereof, with flowability being reduced over time and developability, transferability, and cleanability being worsened.

Moreover, when such a toner is recovered by cleaning treatment, returned to a developing machine and reused, there is a problem that image quality is easily deteriorated. In order to prevent these problems, increasing the amount of flow assistant even further is conceivable. However, in this case, a problem arises in that an occurrence of black spots on a photoreceptor and scattering of the particles of the flow assistant are brought about.

Meanwhile, if the toner particles contain a releasing agent such as a wax, the releasing agent may be exposed to the surface of the toner particles depending on the combination of the releasing agent and a thermoplastic resin. In particular, if the toner particles utilize a combination of a resin whose elasticity is created by a polymeric component and which is somewhat difficult to pulverize and a brittle wax such as polyethylene, a significant proportion of the polyethylene is exposed to the surface of the toner particles. Although these toner particles are advantageous in terms of release in the fixing process and cleaning the photoreceptor of the untransferred toner, a mechanical force such as a shearing force inside the developing device causes the polyethylene to separate from the toner particles and to migrate to such members as developing rolls, a photoreceptor and carriers. Consequently, because of the contamination of these members, the reliability of the developer drops.

Under such circumstances, in recent years, as a means to prepare a toner in which the shape and the surface composition of the particles are controlled, a suspension polymerization method has been proposed (for example, see Japanese Patent Application Laid-Open (JP-A) No. 8-44111, JP-A No. 8-286416). The suspension polymerization method is a method of dispersing and suspending a polymerizable monomer together with a coloring agent and a releasing agent in an aqueous medium, and polymerizing the monomer to obtain toner particles. According to this suspension polymerization method, for example, toner particles having a multi-layered structure in which a wax used as a releasing agent is covered with a binder resin can be obtained.

However, in the case of this suspension polymerization method, it is necessary to regulate particles so that they are an appropriate size in the suspended state. For this reason, it is necessary to stir the suspension vigorously and at a high speed. However, generally, the polymerizable monomer and the wax are greatly different in viscosity, and have poor compatibility, therefore, it is extremely difficult to disperse them uniformly. The wax therefor becomes freed, and a large amount of toner particles having an extremely small content of wax, or containing no wax are produced. As a result, an uneven distribution of composition among toner particles becomes great, and there is a problem that various properties required of a toner such as fixability and chargeability cannot be sufficiently satisfied. Currently, in the suspension polymerization method, there are no established techniques for effectively suppressing freeing of a releasing agent such as wax.

In recent years, demand for higher image quality has been increased and, particularly, in color image formation, in order to realize a high-definition image, minimization of and uniformization of particle diameter in toners tends to be marked. For this reason, a dispersion must be stirred even more vigorously and at even higher speed. However, in this case, there is a problem that not only is the uneven distribution of composition among toner particles further promoted, but also particle size distribution of a toner is widened, and uniformization of particle diameter of a toner becomes difficult. When an image is formed using a toner having a wide particle size distribution, a problem of pollution of a developing roll, a charging roll, a charging blade, a photoreceptor and a carrier, as well as toner scattering, becomes marked with a toner of a finer powder in the particle diameter distribution, and it becomes difficult to realize high image quality and a high reliability simultaneously.

There is also a problem that such a toner having a wide particle size distribution is also inferior in reliability in a system having a cleaning function or toner recycling function. In order to realize high image quality and high reliability simultaneously, it becomes necessary to have a sharper particle size distribution of a toner, and reduce and uniformize the particle diameter.

In order to satisfy the demand for higher image quality, fixability of a toner is an important factor. In order to obtain sufficient fixability in a toner, it is necessary to extend the fixation temperature region. In the art, offset with higher temperatures has been generally prevented by using plural resins having different molecular weights or a gel component as a binder resin, and it has been required that a molecular weight distribution expressed by a ratio (Mw/Mn) of weight average molecular weight (Mw) to number average molecular weight (Mn) in a toner be usually 40 or more.

However, particularly with a color image, color mixability of a fixed image, smoothness of image surface and, further, transparency of image are damaged with plural resins having different molecular weights or a gel component, and image quality is markedly deteriorated. In particular, when an image is fixed on film, this influence becomes extremely great. Conversely, when one kind of resin is used, and the molecular weight is maintained constant, or a resin containing no gel component is used, there is no problem in the color mixability of a fixed image, smoothness of image surface, or transparency of image. However, in particular, when a large amount of a releasing agent is added, the viscosity of toner is reduced, and offset with higher temperatures is more easily caused.

Particularly, in color image formation, when a toner is fixed on a paper or a film, it is necessary to improve the smoothness of a toner-fixed image to maintain color developability and transparency of image. For this reason, in the art, by providing an oil having high releasability such as a silicone oil to a fixing roll, the fixing roll has been generally made to have both releasability with respect to a toner and smoothness.

However, in this case, there is a problem that oil is transferred to a paper or a film during fixation, and a stickiness on an image is produced. In the case of a paper, there is a problem that since the surface energy of the paper is reduced due to the oil, it is difficult to write with a pen on a paper with a fixed image formed thereon. Further, in the case of a film, there is a problem that transparency of a fixed image is worsened due to the oil remaining on the film.

In the art, a toner obtained by an emulsion polymerization aggregation method (EA method) based on a radical monomer-based styrene/acrylic acid ester copolymer or styrene/methacrylic acid ester copolymer has been proposed. However, the toner has defects that strength of a fixed image is weak, there is a high degree of adhesion to a vinyl chloride resin, and image retainability is worsened. In order to endow the toner with a high fixed image strength, it is necessary as a whole to set the average molecular weight high and widen the molecular weight distribution. Consequently, the fixing temperature is elevated, luster after fixation is reduced, and high color developability cannot be obtained.

In order to solve this problem, a method of dissolving a polyester resin in an organic solvent, mixing with a coloring agent, and suspending the mixture to prepare a toner has been proposed. However, since a large amount of solvent is used, there is influence from remaining solvent felt in recovery of the solvent and in the toner, which is an unsatisfactory condition.

In addition, a method of heating to melt crystalline polyester, bringing this to fine particles in water, and aggregating and coalescing the dispersed resin particles with dispersed particles of a coloring agent and a wax to prepare a toner has been also proposed. However, in this procedure, it is necessary to heat the polyester resin to a high temperature, and the method is not satisfactory from the viewpoint of burden on the environmental.

On the other hand, a copolymer of a cyclic keteneacetal compound and a particular vinyl-based monomer has been proposed (for example, see Japanese Patent No. 2826634). However, since a copolymer of this structure is a copolymer that is both biodegradable and photodegradable, it is not suitable for use in a toner for developing electrostatic latent images.

In addition, a rubber composition using a particular cyclic keteneacetal has been proposed (for example, see Japanese Patent No. 3348471). However, with this constitution, a toner cannot be prepared with the production method of a toner of the present proposal.

On the other hand, in recent years, from the viewpoint of burden on the environment, reduction of energy used in the preparation of toner and of energy used in printers or copying machines is in demand by the market.

Regarding the process for preparing a toner, a suspension polymerization method and an emulsion polymerization aggregation method (EA method) have been developed from processes in the art, being thermal melting-kneading, grinding, and classification methods. From the viewpoint of energy used in preparation, the process has been proceeding towards reduction.

However, energy necessary for preparing a toner resin has not been sufficiently reduced yet.

Particularly, with a polyester resin for which energy used in fixing can be reduced, much energy is currently consumed as compared to a vinyl-polymerized resin. Also, it cannot yet be said that the total consumed energy of energy for resin preparation, toner preparation, or fixing is at a sufficient level.

From this point of view, a toner for developing an electrostatic latent image characterized in that the toner is obtained by suspension-polymerizing a vinyl monomer in the presence of a coloring agent and a ring-opening polymer of lactone has been proposed (for example, see JP-A No. 9-269610). However, in this method, since a ring-opening polymer of lactone is made and, thereafter, a vinyl monomer is added, and the materials are dissolved, it is difficult to introduce a three-dimensional crosslinked structure to a polyester structure.

And, a production method for a lactone-based copolymer involving reacting lactone and a polyester resin in the presence of a ring-opening polymerization catalyst has been proposed (for example, see JP-A No. 9-269610).

In the art, in the ring-opening polymerization of lactone, polyester has been synthesized by cation, anion, and coordination anion ring-opening polymerization.

However, this process is a production method for a resin and, when this method is used in the production method of a toner, it is necessary to convert this resin into even finer particles. For doing so, since a large amount of energy or an organic solvent is used, this puts a great burden on the environment.

On the other hand, upon using the EA method as a production method of a toner, resin particles of 1 μm or less are necessary, and when conventional polyester resin is used, or when the resin proposed by JP-A No. 7-149878 is used, it is necessary to grind the resin under high temperature and/or under high pressure, and much energy for grinding is required. Additionally, it is difficult for a polyester resin structure to take on a cross-linked structure. For this reason, it had been that a toner t that had a satisfactory toner fixing property and retainability could not be obtained.

The invention has been devised to provide a production method of resin particles which enables reduction of environmental burden in the preparation of resin particles used for preparing a toner and, in particular, enables a restrained use of an organic solvent, and provides resin particles obtained by the process.

The invention also provides a toner for developing an electrostatic latent image which has excellent retainability and fixed image retainability, and which can suppress the occurrence of an offensive odor during fixing, production method thereof, an electrostatic latent image developer, and an image forming method.

The invention further provides a toner for developing an electrostatic latent image which does not cause unevenness in solid melting or background staining, has excellent fixing strength and adherability to vinyl chloride, and can suppress the occurrence of an offensive odor during fixation, production method thereof, an electrostatic latent image developer, and an image forming method.

SUMMARY OF THE INVENTION

A first aspect of the present invention provides a producing method of a resin particle, which comprises at least an emulsification step of emulsifying a composition containing at least a polymerizable monomer and a polymerization catalyst to form droplets of the composition, and a polymerization step of polymerizing the polymerizable monomer in the drops to synthesize resin particles, wherein the composition is one selected from Composition A, Composition B, or Composition C:

(Composition A): a composition containing a vinyl-based monomer, lactone, a vinyl-based monomer polymerization catalyst for polymerizing the vinyl-based monomer, and a lactone polymerization catalyst for polymerizing the lactone, (Composition B): a composition containing a polyester resin, lactone, and a lactone polymerization catalyst for polymerizing the lactone, (Composition C): a composition containing a vinyl-based monomer, a cyclic keteneacetal compound represented by the following Formula (1), and a radical polymerization initiator.

Formula (1)

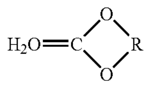

(in the general formula (1), R represents a chain or cyclic divalent aliphatic group optionally containing an ether linkage, wherein the aliphatic group may have a substituent)

A second aspect of the present invention provides resin particles prepared by the process for preparing resin particles as defined in the first aspect.

A third aspect of the present invention provides a producing method of a toner for developing an electrostatic latent image, which comprises at least an aggregation step of mixing a resin particle dispersion in which resin particles as defined in the second aspect are dispersed, a coloring agent dispersion in which a coloring agent is dispersed, and a releasing agent dispersion in which a releasing agent is dispersed to form aggregated particles containing resin particles, a coloring agent and a releasing agent, to obtain an aggregated particle dispersion, and a fusing step of heating and fusing the aggregated particles.

A fourth aspect of the present invention provides a toner for developing an electrostatic latent image prepared by the process for preparing a toner for developing an electrostatic latent image as defined in the third aspect.

A fifth aspect of the present invention provides an electrostatic latent image developer comprising at least a toner for developing an electrostatic latent image as defined in the fourth aspect.

A sixth aspect of the present invention provides an image forming method, which comprises a latent image forming step of forming an electrostatic latent image on a latent image bearing body surface, a developing step of developing the electrostatic latent image formed on the latent image bearing surface using a developer carried in a developer carrier to form a toner image, a transferring step of transferring the toner image formed on the latent image bearing body surface to a surface of a body to be transferred, and a fixing step of thermally fixing the toner image transferred to a surface of the body to be transferred, wherein the developer is an electrostatic latent image developer as defined in the fifth aspect.

DETAILED DESCRIPTION OF THE INVENTION

The resin particles and a producing method thereof, the toner for developing an electrostatic latent image and the producing method thereof, the electrostatic image developer as well as the image forming method of the invention will be explained in detail below.

<Resin Particles and Producing Method Thereof (First Mode)>

A first mode of the process for preparing resin particles of the invention comprises at least an emulsification step of emulsifying a resin precursor composition containing at least a vinyl-based monomer, lactone, a vinyl-based monomer polymerization catalyst for polymerizing the vinyl-based monomer, and a lactone polymerization catalyst for polymerizing the lactone to form droplets of the resin precursor composition, a lactone polymerization step of polymerizing the lactone in the droplets to synthesize a polyester resin, and a vinyl-based monomer polymerization step of polymerizing the vinyl-based monomer in the droplets to synthesize a vinyl-based resin.

Lactone and a vinyl-based monomer contained in the resin precursor composition are polymerized in a lactone polymerization step and a vinyl-based monomer polymerization step, respectively, to form a polymer. For this reason, an organic solvent does not remain in the resin particles of the invention prepared by the process for preparing resin particles of the invention.

The resin precursor composition is emulsified by placing it into water, and stirring this at a high speed. Since lactone and a vinyl-based monomer are polymerized in water, respectively, to form a polymer, a content of lactone and a vinyl-based monomer in water can be suppressed minimum. As a result, treatment of wastewater produced in preparation of resin particles becomes easy.

Further, by using metal triflate or an enzyme catalyst described later as the lactone polymerization catalyst, a temperature for polymerizing lactone can be lowered. For this reason, preparation energy necessary for preparing resin particles can be reduced.

Lactone in the invention refers to a cyclic compound having an ester group in a molecule. As the lactone, lactone which is liquid at 50° C. is used.

The number of ring members of the lactone is preferably 4 to 20, further preferably 5 to 15.

Specific examples of the lactone include β-propiolactone, γ-butyrolactone, δ-valerolactone, ε-caprolactone, 11-undecanolide, 12-dodecanolide, and 15-pentadecanolide. Among them, ε-caprolactone, 11-undecanolide, 12-dodecanolide, and 15-pentadecanolide are preferable.

A monomer which can polymerization-reacted with the lactone to form a polyester resin (hereinafter, referred to as polyester-based monomer in some cases) may be contained in the resin precursor composition in such a range that characteristics of the invention are not deteriorated.

Examples of the polyester-based monomer include alcohol as well as carboxylic acid, anhydride thereof and ester thereof.

As the alcohol, aliphatic polyols such as ethylene glycol, propylene glycol, 1,4-butandiol, 1,5-pentanediol, 1,6-hexanediol, glycerin, trimethylolethane, trimethylolpropane, and pentaerythritol, and alicyclic alcohols such as 1,4-cyclohexanediol, and 1,4-cyclohexanedimethanol can be used as necessary.

Examples of aromatic dicarboxylic acid include terephthalic acid, isophthalic acid, and phthalic acid. Examples of ester thereof include low-molecular alcohol ester of the dicarboxylic acid, for example, dimethyl terephthalate, diethyl terephthalate, and dimethylisophthlate.

Examples of alkylsuccinic acid and alkenylsuccinic-acid, anhydride thereof, and ester thereof include n-butylsuccinic acid, n-butenylsuccinic acid, isobutylsuccinic acid, isobutenylsuccinic acid, n-octylsuccinic acid, n-octenylsuccinic acid, n-dodecylsuccinic acid, n-dodecenylsuccinic acid, isododecylsuccinic acid, isododecenylsuccinic acid, anhydride thereof, and lower alkyl ester thereof.

Examples of tri- or more-valent polyhydric carboxylic acid, anhydride thereof, and lower alkyl ester thereof which can be used in the invention include 1,2,4-benzenetricarboxylic acid (trimellitic acid), 1,2,5-benzenetricarboxylic acid, 2,5,7-naphthalenetricarboxylic acid, 1,2,5-hexanetricarboxylic acid, 1,3-dicarboxyl-2-methyl-2-methylenecarboxypropane, tetra(methylenecarboxyl)methane, 1,2,7,8-octanetetracarboxylic acid, trimesic acid, pyromellitic acid, anhydride thereof, and lower alkyl ester compound thereof. In particular, trimellitic acid, trimesic acid, pyromellitic acid, anhydride thereof, and methyl ester compound, and ethyl ester compound thereof are preferable.

Examples of a tri- or more-valent alcohol component which can be used in the invention include sorbitol, 1,2,3,6-hexanetetol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, triemethylolethane, trimethylolpropane, and 1,3,5-hydroxymethylbenzene.

Examples of a dialcohol component which can be used in the invention include polyoxyalkylenebisphenol-type diols and, among them, preferably include polyoxyethylenebisphenol-type diol, and polyoxypropylenebisphenol-type diol.

These polyester-based monomers may be used alone, or a plurality of vinyl-based monomers may be combined.

The vinyl-based monomer can dissolve a polyester resin synthesized by polymerization of the lactone and a polyester-based monomer used as necessary, and is not particularly limited as far as it is liquid at 50° C.

Examples of the vinyl-based monomer include styrenes such as styrene, vinyltoluene, and α-methylstyrene, esters having a vinyl group such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate, vinylnitrile such as acrylonitrile, and methacrylonitrile, vinyl ethers such as vinyl methyl ether, and vinyl isobutyl ether, and vinylketones such as vinyl methyl ketone, vinyl ethyl ketone, and vinyl isopropenyl ketone.

An arbitrary cross-linking agent can be used together with these vinyl-based monomers, as necessary. Examples of the cross-linking agent include aromatic divinyl compounds such as divinylbenzene, divinylnaphthalene, and a derivative thereof, diethylenic unsaturated carboxylic acid esters such as ethylene glycol dimethacrylate, and diethylene glycol dimethacrylate, divinyl compounds such as N,N-divinylaniline, and divinyl ether, and compounds having 3 or more vinyl groups.

These cross-linking agents can be used alone, or by combining a plurality of them. The cross-linking agent is used usually at a ratio of 0 to 100 parts by mass per 100 parts by mass of the vinyl-based monomer.

In the resin precursor composition, a content of lactone relative to a total amount of lactone and the vinyl-based monomer as well as the polyether-based monomer and the cross-linking agent which are used as necessary is preferably 5 to 90% by mass, further preferably 10 to 80% by mass, particularly preferably 10 to 60% by mass.

When a content of lactone is 90% by mass or more, it becomes difficult to emulsify the resin precursor composition in some cases. When a content of lactone is less than 5% by mass, fixing property and retainability of a toner for developing an electrostatic latent image described later are worsened in some cases.

The lactone polymerization catalyst is not particularly limited as far as it can polymerize the lactone and various polyester-based monomers used as necessary. For example, a metal oxide, an organometallic compound, and an enzyme catalyst can be used. A catalyst which acts as a Lewis acid is preferable, and a Lewis acid catalyst containing a rare earth element as a constitutional element is particularly preferable.

A polyester resin can be obtained by adding an organometallic compound (organotin compound, organotitanium compound), a halogenated organometallic compound (halogenated organotin), metal triflate or an enzyme catalyst, which acts as a Lewis acid, as the lactone polymerization catalyst at a ratio of about 0.1 to 10,000 ppm, and polymerizing the material at a temperature of 150° C. or lower, preferably 100° C. or lower, preferably under the inert atmosphere.

It is preferable to use metal triflate or an enzyme catalyst as the lactone polymerization catalyst. By using the metal triflate, the lactone can be polymerized at a low temperature (100° C. or lower). And, it also becomes possible to perform polycondensation with other alcohol and carboxylic acid at a low temperature.

By using an enzyme catalyst, it becomes possible to polymerize the lactone at a low temperature (100° C. or lower).

It is preferable that a Lewis acid catalyst containing the rare earth element as a constitutional element is rare earth metal triflate represented by the following formula.

$X(OSO_2CF_3)_3$ (wherein X represents a rare earth element)

As the rare earth metal triflate, lanthanoid triflate is preferable. Lanthanoid triflate is described in detail in Journal of Synthetic Organic Chemistry, Japan, vol. 53, No. 5, p 44-54. Specific examples of the lanthanoid element include lanthanum (La), cerium (Ce), praseodymium (Pr), neodymium (Nd), promethium (Pm), samarium (Sm), europium (Eu), gadolinium (Gd), terbium (Th), dysprosium (Dy), holmium (Ho), erbium (Er), thulium (Tm), ytterbium (Yb), and lutetium (Lu).

Among them, as the rare earth metal triflate, $H(OSO_2CF_3)_3$ (X is scandium (Sc), yttrium (Y), ytterbium (Yb) or samarium (Sm)) is preferable.

Examples of the enzyme catalyst include lipase, protease, and cellulase. Among them, examples of lipase include lipase derived from *Pseudomonas fluorescens*, lipase derived from *Pseudomonas cepasia*, lipase derived from *Porcine pancreas*, lipase derived from *Candida rugosa*, lipase derived from *Aspergillus niger*, lipase derived from *Rhizopus delemer*, and lipase derived from *Rhizopus japonicus*.

The lactone polymerization catalysts can be used alone, and a plurality of catalysts can be used as necessary.

When metal triflate is used as a catalyst, a content of the lactone polymerization catalyst in the resin precursor composition is preferably 0.1 to 10,000 ppm, further preferably 0.1 to 7,000 ppm. When an enzyme catalyst is used, the content is preferably 100 to 100,000 ppm, further preferably 1,000 to 50,000 ppm.

The vinyl-based monomer polymerization catalyst may be an oil-soluble polymerization initiator which is soluble in a vinyl-based monomer, and examples include peroxides such as methyl ethyl peroxide, di-t-butyl peroxide, acetyl peroxide, dicumyl peroxide, lauroyl peroxide, benzoyl peroxide, t-butylperoxy-2-ethylhexanoate, di-isopropyl peroxydicarbonate, and di-t-butyl peroxyisophthalate; azo compounds such as 2,2'-azobis(2,4-dimethylvaleronitrile), 2,2'-azobisisobutyronitrile, and 1,1'-azobis(1-cyclohexanecarbonitrile).

The oil-soluble polymerization initiator is used at a ratio of usually 0.1 to 20 parts by mass, preferably 1 to 10 parts by mass per 100 parts by mass of a vinyl-based monomer.

The resin precursor composition can be emulsified by placing the resin precursor composition into water, and performing emulsification using a rotation shear-type homogenizer, or a ball mill, a sand mill, or a dynomil having media. Thereby, droplets of the resin precursor composition can be formed.

An average particle diameter of the droplets is preferably 1 μm or smaller, further preferably 0.01 to 1 μm. By making an average particle diameter of the droplets 1 μm or smaller, resin particles having an average particle diameter of 1 μm or smaller can be formed.

An average particle diameter of resin particles of the invention is preferably 1 μm or smaller, further preferably 0.01 to 1 μm. When an average particle diameter exceeds 1 μm, a particle size distribution of the finally obtained toner for developing an electrostatic latent image is widened, freed particles are generated, and reduction in performance and reliance is easily incurred. On the other hand, when an average particle diameter is in the aforementioned range, it is advantageous in that not only there is no defect described above, but also deviation between toners is reduced, dispersion of a toner becomes better, and variation in performance and reliance becomes small. An average particle diameter can be measured, for example, using a Coulter counter.

<Resin Particles and Producing Method Thereof (Second Mode)>

A second mode of the process for preparing resin particles of the invention comprises at least an emulsification step of emulsifying a polyester resin composition containing a polyester resin, lactone, and the polymerization catalyst for polymerizing lactone to form droplets of the polyester resin composition, and a polymerization step of polymerizing lactone in the droplets to form polyester resin particles.

In the polyester resin composition, the lactone functions as a solvent for the polyester resin, and the lactone is polymerized to form a polyester resin in the polymerization step. For this reason, an organic solvent does not remain in polyester resin particles prepared by the process for preparing polyester resin particles of the invention. Hereinafter, in the invention, a polyester resin derived from polymerization of lactone is referred to as polymerization-derived polyester resin, and other polyester resin is simply referred to as polyester resin.

When lactone used as a solvent causes polymerization to form a polymerization-derived polyester resin, air pollution and deterioration in working environment due to volatilization of lactone are not caused.

The polyester resin composition is emulsified by placing it into water, followed by stirring at a high speed. Since lactone causes polymerization in water to form a polymerization-derived polyester resin, a content of lactone in water can be suppressed minimum. As a result, it becomes easy to treat wastewater produced by preparation of polyester resin particles.

Examples of the polyester resin include an aliphatic polyester resin, and an aromatic polyester resin containing diole and dicarboxylic acid as a main component. Any polyester resin can be used as far as it is a polyester resin of a kind, which is compatible with lactone. Further, the polyester resin may have a linear structure or a cross-linked structure in such a range that compatibility is not prevented.

A weight average molecular weight of the polyester resin by a GPC method is preferably 2,000 to 50,000, further preferably 5,000 to 30,000. When a weight average molecular weight of the polyester resin is 2,000 to 50,000, heating responsiveness is rapid, and a toner can be melted at a heating temperature of 150° C. or lower.

When a melting point or a softening point of the polyester resin is 150° C. or lower, it is possible to reduce consumed power at toner fixation.

In the invention, lactone refers to a cyclic compound having an ester group in a molecule. As the lactone, lactone which is liquid at 80° C. is used.

The number of ring members of the lactone is preferably 4 to 20, further preferably 5 to 15.

Specific example of the lactone include the same lactones as those of the first mode.

A content of lactone relative to a total amount of lactone and a polyester resin in the polyester resin composition is preferably 10 to 90% by mass, further preferably 30 to 80% by mass.

When a content of lactone is less than 10% by mass, a viscosity of a polyester resin composition upon mixing and stirring of lactone with a polyester resin is high, and it becomes difficult to finely-divide a resin at a later step in some cases. When the content exceeds 90% by mass, it has adverse effect on fixing property and charging property of a toner in some cases.

A monomer which can polymerization-react with lactone to form a polymerization-derived polyester resin may be contained in the polyester resin composition in such a range that the characteristics of the invention are not prevented.

Examples of the monomer include alcohol as well as carboxylic acid and anhydride thereof or an ester thereof.

As the alcohol, aliphatic polyols such as ethylene glycol, propylene glycol, 1,4-buthanediol, 1,5-pentanediol, 1,6-hexanediol, glycerin, trimethylolethane, trimethylolpropane, and pentaerythritol, and alicyclic alcohols such as 1,4-cyclohexanediol, and 1,4-cyclohexanedimethanol can be used as necessary.

Examples of the aromatic dicarboxylic acid include the same aromatic dicarboxylic acids as those of the first mode.

Examples of alkylsuccinic acid and alkenylsuccinic acid, anhydride thereof, and ester thereof include those described for the first mode.

Examples of tri- or more-valent polyvalent carboxylic acid, anhydride thereof, or lower alkyl ester thereof which can be used in the invention include those described for the first mode.

Examples of the tri- or more-valent alcohol compound which can be used in the invention include those described for the first mode.

Examples of the dialcohol component which can be used in the invention include those described for the first mode.

Other examples include lactides such as dilactide and glycolide, and carbolactones such as trisalicylide, hexasalicylide, phthalide, and coumarin.

The aforementioned polymerization catalyst is not particularly limited as far as it can polymerize the lactone and various monomers which are used as necessary. A metal oxide, and an organometallic compound can be used, and it is preferable to use a Lewis acid catalyst containing a rare earth element as a constitutional element, or an enzyme catalyst. By using these catalysts, lactone can be polymerized at a low temperature (100° C. or lower). It also becomes possible to perform polycondensation with other alcohol and carboxylic acid at a low temperature.

By using an enzyme catalyst, it becomes possible to polymerize lactone at a low temperature (100° C. or lower).

If polymerization is possible at 100° C. or lower, since a polymerization reaction can be performed at a normal pressure, productivity of polyester resin particles can be improved. It is preferable that the Lewis acid catalyst containing a rare earth element as a constitutional element is rare earth metal triflate as in the first mode.

$$X(OSO_2CF_3)_3$$

(wherein X represents a rare earth element)

Examples of the rare earth metal triflate include the same rare earth metal triflates as those of the first mode.

Examples of the enzyme catalyst include the same enzyme catalysts as those of the first aspect.

Examples of emulsification of the polyester resin composition include the same emulsification as that of the first mode.

An average particle diameter of the droplets is preferably 1 μm or smaller, further preferably 0.01 to 1 μm. By making an average particle diameter of the droplets 1 μm or smaller, a polyester resin particle having an average particle diameter of 1 μm or smaller can be formed.

By heating the droplets to 100° C. or lower, lactone contained in the droplets causes a polymerization reaction, and polyester resin particles are formed. It is preferable that the droplets are heated under the inert atmosphere.

An average particle diameter of the polyester resin particles of the invention is preferably 1 μm or smaller, further preferably 0.01 to 1 μm. When an average particle diameter exceeds 1 μm, a particle size distribution of the finally obtained toner for developing an electrostatic latent image is widened, freed particles are generated, and reduction in performance and reliance is easily incurred. On the other hand, when an average particle diameter is in the aforementioned range, it is advantageous in that not only there is not defect described above, but also deviation between toners is reduced, dispersion of a toner becomes better, and variation in performance and reliance becomes small. An average particle diameter can be measured, for example, using a Coulter counter.

In a producing method of the polyester resin particles of the invention, as a solvent for dissolving a polyester resin, lactone is used. Lactone forms a polymerization-derived polyester resin by heating. For this reason, polyester resin particles of the invention do not contain a remaining solvent.

<Resin Particles and Producing Method Thereof (Third Mode)>

A third mode of a process for a preparing resin particles of the invention comprises at least an emulsification step of emulsifying a resin precursor composition containing a vinyl-based monomer, a cyclic keteneacetal compound represented by the following general formula (1), and a radical polymerization initiator to form droplets of the resin precursor composition, and a polymerization step of polymerizing the vinyl-based monomer and the cyclic keteneacetal compound in the droplets to synthesize a vinyl-based copolymer.

Formula (1)

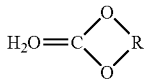

In the general formula (1), R represents a chain or cyclic divalent aliphatic group optionally containing an ether linkage. The aliphatic group may have a substituent.

The vinyl-based monomer and the cyclic keteneacetal compound contained in the resin precursor composition are polymerized in the polymerization step to form a polymer. For this reason, an organic solvent does not remain in resin particles of the invention prepared by a producing method of resin particles of the invention.

The resin precursor composition is emulsified by placing it into water, followed by stirring at a high speed. Since the vinyl-based monomer and the cyclic keteneacetal compound causes polymerization in water to form a polymer, a content of the vinyl-based monomer and the cyclic keteneacetal compound in water can be suppressed minimum. As a result, it becomes easy to treat wastewater produced in preparation of resin particles.

The vinyl-based monomer is not particularly limited as far as it is liquid at 100° C.

A molecular weight of the vinyl-based monomer is preferably 50 to 500, further preferably 70 to 300. When a molecular weight of the vinyl-based monomer is particularly 70 to 250, a glass transition temperature of a resin obtained by a reaction with cyclic keteneacetal can be 40° C. to 150° C.

Examples of the vinyl-based monomer include the same vinyl-based monomers as those of the first mode.

An arbitrary cross-linking agent can be used together with the vinyl-based monomer as necessary. Examples of the cross-linking agent include the same cross-linking agents as those of the first mode.

R in the cyclic keteneacetal compound represented by the general formula (1) represents a chain or cyclic divalent aliphatic group optionally containing an ether linkage.

The aliphatic group may have a substituent. The number of carbons in the aliphatic group is not particularly limited, but is usually 1 to 22, preferably 1 to 12, more preferably 1 to 8.

When the aliphatic group contains an ether linkage, the number of ether linkages contained in the aliphatic group is not particularly limited, but may be one or plural. Specific examples of the aliphatic group containing an ether linkage include polyoxymethylene, polyoxyethylelene, polyoxypropylene, and polyoxybutylene.

The aliphatic group may have a substituent, and examples of the substituent include various kinds of substituents such as an alkyl group, an aryl group, an aralkyl group, an alkoxy group, an aryloxy group, an aralkyloxy group, an acyl group, an acyloxy group, a hydroxyl group, a thiol group, a carboxyl group, an alkoxycarbonyl group, a keto group, an amino group, an halogen.

Examples of the cyclic keteneacetal compound used in the invention include 2-methylene-1,3,6-trioxolane, 2-methylene-1,3-dioxolane, 2-methylene-1,3-dioxane, 2-methylene-1,3-dioxepane, 2-methylene-4-phenyl-1,3-dioxolane, 4,7-dimethyl-2-methylene-1,3-dioxepane, 5,6-benzo-2-methylene-1,3-dioxepane, 4-n-hexyl-2-methylene-1,3-dioxolane, 4-n-decyl-2-methylene-1,3-dioxolane, and 4,5-dicarbomethoxy-1,3-dioxolan.

Examples of the radical polymerization initiator used in the invention include ultraviolet-ray radical polymerization initiators using initiators such as peroxides such as methyl ethyl peroxide, di-t-butyl peroxide, acetyl peroxide, dicumyl peroxide, lauroyl peroxide, benzoyl peroxide, t-butylperoxy-2-ethyl hexanoate, di-isopropyl peroxydicarbonate, and di-t-butyl peroxyisophthalate; azo compounds such as 2,2'-azobis (2,4-diemthylvaleronitrile), 2,2'-azobisisobutyronitrile, and 1,1'-azobis(1-cyclohexanecarbonitrile); aromatic ketones such as benzophenone, Michler's ketone, xanthone, thioxanthone, 2-chlorothioxanthone, and 2-ethylanthraquinone; acetophenones such as acetophenone, trichloroacetophenone, 2-hydroxy-2-methylpropiophenone, 2-hydroxy-2-methyl-4'-isopropylpropiophenone, benzoin isobutyl ether, and 2,2-diethoxyacetophenone, and visible light radical polymerization initiators using α-diketone/amine-based initiators such as norcamphorquinone/N,N-dimethylaminoethyl methacrylate, and camphorquinone/N,N-dimethylaminoethyl methacrylate.

The radical polymerization initiator is used at a ratio of usually 0.1 to 20 parts by mass, preferably 1 to 10 parts by mass per 100 parts by mass of a total amount of the vinyl-based monomer and the cyclic keteneacetal compound.

A content of the cyclic keteneacetal compound in the resin precursor composition is preferably 5 to 90% by mass, further preferably 7 to 80% by mass, particularly preferably 10 to 70% by mass. When a content of the cyclic keteneacetal compound is 90% by mass or more, it becomes difficult to control charging due to variation in environment of a toner for developing an electrostatic latent image described later in some cases. When a content of the cyclic keteneacetal compound is less than 5% by mass, fixing property, retainability, and vinyl chloride adherability resistance of a toner for developing an electrostatic latent image described later are worsened in some case.

By radical ring-opening polymerization of a cyclic keteneacetal compound, since an ester linkage is introduced into a main chain skeleton, a fixed image strength of a toner for developing an electrostatic latent image described later is enhanced. And, by the presence of a large amount of an ester group, vinyl chloride adhesion is prevented.

<Toner for Developing Electrostatic Latent Image and Producing Method Thereof>

A producing method of a toner for developing an electrostatic latent image of the invention comprises at least an aggregation step of mixing a resin particle dispersion in which resin particles of the invention are dispersed, a coloring agent dispersion in which a coloring agent is dispersed, and a releasing agent dispersion in which a releasing agent is dispersed to form aggregated particles containing resin particles, a coloring agent and a releasing agent, to obtain an aggregated particle dispersion, and a fusing step of heating and fusing the aggregated particles.

The process for preparing a toner for developing an electrostatic latent image of the invention can further comprises other steps as necessary. For example, the process may preferably comprise a step of adding a fine particle dispersion in which a fine particle is dispersed in the aggregated particle dispersion, and mixing this to adhere the fine particle to the aggregated particles, to form adhered particles (hereinafter, referred to as "adhesion step") after the aggregation step and before the fusing step.

Hereinafter, in the invention, a toner for developing an electrostatic latent image is simply referred to as toner or toner particles.

The aggregation step is a step of aggregating resin particles, a coloring agent and a releasing agent in a dispersion obtained by mixing the resin particle dispersion, the coloring agent dispersion, and the releasing agent dispersion to form aggregated particles, thereby, preparing an aggregated particle dispersion.

In the invention, as the resin particles, at least two kinds of resin particles having different molecular weights may be used. Among the at least two kinds of resin particles having different molecular weights, resin particles having the greatest molecular weight have a weight average molecular weight (Mw) of preferably 100,000 to 1,500,000, more preferably 100,000 to 1,200,000, particularly preferably 150,000 to 1,000,000.

In the invention, as a weight average molecular weight (Mw) of the resin particles having the greatest molecular weight, a numerical range having any lower limit value or upper limit value of the aforementioned numerical range or a value of a weight average molecular weight (Mw) in Examples described later as a lower limit, and any lower limit value or upper limit value of the aforementioned numerical range or a value of a weight average molecular weight (Mw) in Examples described later is also preferable.

When a weight average molecular weight (Mw) of the resin particles having the greatest molecular weight is in the aforementioned numerical range, it is advantageous in that desired transparency is obtained. On one hand, when a weight average molecular weight (Mw) of the resin particles having the greatest molecular weight exceeds 1,500,000, it becomes difficult to obtain smoothness of a fixed image. On the other hand, when the weight average molecular weight is below 100,000, since reduction in a viscosity at high temperature fixation can not be suppressed, offset is easily caused.

In the aggregation step, resin particles, a coloring agent and a releasing agent which are dispersed in the mutually mixed aforementioned resin particle dispersion, coloring agent dispersion and releasing agent dispersion are aggregated to form aggregated particle.

The aggregated particles are formed by heteroaggregation, and can be formed, for example, by shifting balance of polarity and an amount of an ionic surfactant contained in a dispersion to which another dispersion is added, and a dispersion to be added in advance, and adding an ionic surfactant at such polarity and amount that the shift of balance is compensated.

In the adhesion step, the aggregated particles are mother particles, and fine particles in a fine particle dispersion which have been added to and mixed in an aggregated particle dispersion in which the aggregated particles are dispersed are uniformly adhered to a surface of the mother particles, to form adhered particles. The adhered particles are formed by heteroaggregation, and are formed, for example, by sliding balance of polarity and an amount of an ionic surfactant contained in a dispersion to which another dispersion is added, and a dispersion to be added in advance, and adding an ionic surfactant at such polarity or amount that the shift of balance is compensated.

In the fusing step, a resin in the aggregated particles is melted, and the resin particles, a coloring agent and a releasing agent are fused to form a toner for developing an electrostatic latent image. When the adhesion step is performed, in the fusing step, a resin in the adhered particles is melted, and fused to form a toner for developing an electrostatic latent image.

At least a coloring agent is dispersed in the coloring agent dispersion.

Examples of the coloring agent include various pigments such as carbon black, chrome yellow, Hansa yellow, benzidine yellow, threne yellow, quinoline yellow, permanent orange GTR, pyrazolone orange, vulcan orange, Watchung red, permanent red, brilliant carmine 3B, brilliant carmine 6B, Dupont oil red, pyrazolone red, lithol red, rhodamine B lake, lake red C, rose bengal, aniline blue, ultramarine blue, calco oil blue, methylene blue chloride, phthalocyanine blue, phthalocyanine green, and Malachite green oxalate; various dyes such as acridine series, xanthine series, azo series, benzoquinone series, azine series, anthraquinone series, dioxazine series, thiazine series, azomethine series, indigo series, thioindigo series, phthalocyanine series, aniline black series, polymethine series, triphenylmethane series, diphenylmethane series, thiazine series, thiazole series, and xanthene series. These coloring agents may be used alone, or two or more of them may be used jointly.

An average particle diameter of the coloring agent is preferably 1 μm or smaller, further preferably 0.5 μm or smaller, particularly preferably 0.01 to 0.5 μm. When the average particle diameter exceeds 1 μm, a particle size distribution of the finally obtained toner for developing an electrostatic latent image is widened, freed particles are generated, and reduction in performance and reliance is easily incurred. On the other hand, when the average particle diameter is in the aforementioned range, it is advantageous in that not only three is no defect described above, but also deviation between toners is decreased, dispersion of a toner becomes better, and variation in performance and reliance becomes small.

Further, when the average particle diameter is 0.5 μm smaller, it is advantageous in that the resulting toner particles are excellent in color developability, color reproducibility, and OHP transmittability. The average particle diameter can be measured, for example, by using a microtrack.

The releasing agent dispersion is such that at least a releasing agent is dispersed. In the invention, the releasing agent contains at least one kind of an ester consisting of at least one of higher alcohol of a carbon number of 12 to 30 and higher fatty acid of a carbon number of 12 to 30. Since such the ester has moderate polarity, and is rich in compatibility with a resin of the resin particles as compared with, for example, polyolefin other than the ester, when at least one kind of the ester is used as a releasing agent, occurrence of a freed releasing agent can be effectively suppressed in an aggregation step or a fusing step described later.

In general, a releasing agent which is poor in compatibility with a binder resin of toner particles is preferable. When a releasing agent rich in compatibility is used, the resin is plasticized with the releasing agent, a viscosity of a toner at high temperature fixation is reduced, and offset is easily generated. The releasing effect has correlation with a dispersion unit of a releasing agent contained in toner particles and, generally, as the dispersion unit is greater, the releasing effect is greater.

In the case of the process for preparing a toner for developing an electrostatic latent image of the invention, since toner particles are obtained by an aggregation step or a fusing step unlike a normal kneading step, a mechanical stress which is given to a releasing agent in the aggregation step or fusing step is becomes far smaller than a mechanical stress which is given to a releasing agent in a normal kneading step. For this reason, in the process for preparing a toner for developing an electrostatic latent image of the invention, a dispersion unit of a releasing agent contained in toner particles can be controlled regardless of compatibility between the releasing agent and the resin. As a result, in a toner obtained by the process for preparing a toner for developing an electrostatic latent image of the invention, even a releasing agent contained therein rich in compatibility with a resin of the resin particles exhibits sufficient releasing effect.

The releasing agent contains at least one kind of an ester consisting of higher alcohol of a carbon number of 12 to 30 and/or higher fatty acid of a carbon number of 12 to 30 and, when an acid component is the higher fatty acid of a carbon number of 12 to 30, as an alcohol component, in addition to monoalcohol such as methyl, ethyl, propyl and butyl, glycols such as ethylene glycol and propylene glycol, and a multimer thereof, triols such as glycerin and a multimer thereof, polyhydric alcohols such as pentaerythritol, sorbitan, and cholesterol are preferable. The higher fatty acid when these alcohol components are a polyhydric alcohol may be mono-substituted or poly-substituted.

Preferable examples of the releasing agent include esters consisting of higher alcohol of a carbon number of 12 to 30 and higher fatty acid of a carbon number of 12 to 30 such as stearyl stearate, palmityl palmitate, behenyl behenate, and stearyl montanoate; esters consisting of higher fatty acid of a carbon number of 12 to 30 and lower monoalcohol such as butyl stearate, isobutyl behenate, propyl montanoate, and 2-ethylhexyl oleate; esters consisting of higher fatty acid of a carbon number of 12 to 30 and polyhydric alcohol such as montanoic acid monoethylene glycol ester, ethyleneglycol distearate, monostearic acid glyceride, monobehenic acid glyceride, tripalmitic acid glyceride, pentaerythritol monobehenate, pentaerythritol dilinolate, pentaerythritol trioleate, and pentaerythritol tetrastearate; esters consisting of higher fatty acid of a carbon number of 12 to 30 and polyhydric alcohol multimer such as diethylene glycol monobehenate, diethylene glycol dibehenate, dipropylene glycol monostearate, distearic acid diglyceride, tetrastearic acid triglyceride, hexabehenic acid tetraglyceride, and decastearic acid decaglyceride; esters consisting of higher fatty acid of a carbon number of 12 to 30 and a monomer or a multimer of polyhydric alcohol (optionally containing a short chain functional group) such as glycerin monoacetomonostearate, glycerin monoacetomonolinolate, and diglycerin monoacetodistearate; sorbitan higher fatty acid esters such as sorbitan monostearate, sorbitan dibehenate, and sorbitan trioleate; cholesterol higher fatty acid esters such as cholesteryl stearate, cholesteryl oleate, and cholesteryl linolate.

In the invention, among these releasing agents, those used in Examples described later are particularly preferable. These releasing agents may be used alone, or two or more may be used jointly.

As a melting point of the releasing agent, from a viewpoint of retainability of a toner, 30° C. or higher is preferable, 40° C. or higher is more preferable, 50° C. or higher is particularly preferable. A carbon number of an alcohol component and/or an acid component in esters consisting of higher alcohol of a carbon number of 12 to 30 and/or higher fatty acid of a carbon number of 12 to 30 which are used as the releasing agent can be appropriately determined in view of the melting point. When a carbon number of the alcohol component and/or the acid component is less than 12, a melting point of a releasing agent is outside the aforementioned preferable numerical range in some cases. When the carbon number exceeds 30, since polarity of a releasing agent becomes too small, a releasing agent which is freed in an aggregation step or a fusing step is increased in some cases. Both cases are not preferable.

It is necessary that the releasing agent has small solubility in water under temperature conditions in an aggregation step or a fusing step. For this reason, HLB (hydrophilic group/hydrophobic group balance) is preferably 7 or smaller, more preferably 5 or smaller, particularly preferably 3 or smaller. When the HLB exceeds 7, since the releasing agent becomes easy to be dissolved in water in an aggregation step or a fusing step, a problem easily arises that a content of a releasing agent in a toner is decreased, required toner property is not obtained, the releasing agent easily remains in wastewater produced after toner preparation, and wastewater treatment becomes troublesome.

A content of the releasing agent in a toner is preferably 0.5 to 50% by mass, more preferably 1 to 40% by mass, particularly preferably 1 to 30% by mass. When the content is less than 0.5% by mass, releasability is not sufficient, and so-called offset is easily caused in which the toner is adhered to a fixing roll at high temperature fixation. When the content exceeds 50% by mass, a toner becomes brittle, and toner particles are easily ground by stirring in a developing machine. Both cases are not preferable.

An average particle diameter of the releasing agent is preferably 1 μm or smaller, more preferably 0.01 to 1 μm. When the average particle diameter exceeds 1 μm, a particle diameter distribution of the finally obtained toner for developing an electrostatic latent image is widened, freed particles are generated, and reduction in performance and reliance is easily incurred. On the other hand, when the average particle diameter is within the aforementioned range, it is advantageous in that not only there is no defect described above, but also deviation between toners is decreased, dispersion in a toner becomes better, and variation in performance and reliance becomes small. The average particle diameter can be measured using, for example, a microtrack.

A combination of the resin of the resin particles, the coloring agent and the releasing agent is not particularly limited, but appropriately selected freely depending on the purpose.

In the invention, depending on the purpose, other components (particles) such as a releasing component (other than the aforementioned releasing agent), an internal additive, an charging controlling agent, an inorganic powder, an organic powder, a lubricant and an abrasive agent can be dispersed in at least any of the resin particle dispersion, the coloring agent dispersion and the releasing agent dispersion. In this case, other components (particles) may be dispersed in at least any of the resin particle dispersion, the coloring agent dispersion and the releasing agent dispersion, or a dispersion in which other components (particles) are dispersed may be mixed into a mixed solution obtained by mixing the resin particle dispersion, the coloring agent dispersion and the releasing agent dispersion.

Examples of the releasing agent include, in addition to the aforementioned releasing agents, low-molecular polyolefins such as polyethylene, polypropylene and polybutene; silicones having a softening point by heating; fatty acid amides such as oleic acid amide, erucic acid amide, ricinoleic acid amide, and stearic acid amide; vegetable waxes such as carnauba wax, rice wax, candelilla wax, Japan wax and jojoba oil; animal waxes such as beewax; mineral•petroleum waxes such as montan wax, ozokerite, ceresin, paraffin wax, microcrystalline wax, and Fischer-Tropsh wax; and modified products thereof.

A content of these releasing agents in a toner is usually 100% by mass or less, preferably 70% by mass or less, more preferably 50% by mass or less relative to a content of the aforementioned releasing agent. When the content exceeds 100% by mass, an amount of a freed releasing component becomes too large, aggregation of the releasing agent is easily prevented, effect corresponding to an addition amount is not obtained, moreover, it becomes difficult to separate and remove a releasing agent component freed from a toner and, on the other hand, a releasing component freed into wastewater is increased, and wastewater treatment becomes troublesome, being not preferable.

When these waxes are dispersed into an aqueous medium such as water together with a high-molecular electrolyte such as an ionic surfactant, a high-molecular acid, and a high-molecular base, heated to a melting point or higher, and treated using a homogenizer or a pressure discharge-type dispersing machine which can apply a strong shear force, they are easily prepared into fine particles of 1 μm or smaller.

Examples of the internal additives include magnetic substances including metals and alloys such as ferrite, magnetite, reduced iron, cobalt, nickel and manganese as well as compounds containing these metals.

Examples of the charge controllers include quaternary ammonium compounds, nigrosine compounds, dyes composed of a complex of aluminum, iron, chromium and the like, and triphenylmethane pigments. In the present invention, the charge controller preferably has a low solubility in water from the viewpoint of the control of the ionic strength that influences the stability at the time of flocculation and fusion and from the viewpoint of reduction of the contaminated waste water.

Examples of the inorganic particles include all of the inorganic particles, such as silica, alumina, titania, calcium carbonate, magnesium carbonate, calcium phosphate, and cerium oxide, which are usually used as external additives to the surface of toner.

Examples of the organic particles include all of the organic particles, such as vinyl-based resin, polyester resin, and silicone resin, which are usually used as external additives to the surface of toner.

Examples of the lubricants include fatty acid amide, such as ethylenebisstearic acid amide and oleic acid amide, and metal salts of fatty acids such as zinc stearate and calcium stearate.

Examples of the abrasives include silica, alumina, and cerium oxide mentioned above.

An average particle diameter of the other components is preferably 1 μm or smaller, further preferably 0.01 to 1 μm. When the average particle diameter exceeds 1 μm, a particle diameter distribution of the finally obtained toner for developing an electrostatic latent image is widened, freed particles are generated, and reduction in performance and reliance is easily incurred. On the other hand, when the average particle diameter is within the aforementioned range, it is advantageous in that not only there is no defect described above, deviation between toners is decreased, dispersion of toner becomes better, and variation in performance and reliance becomes small. The average particle diameter can be measured, for example, using microtrack.

Examples of a dispersing medium in the resin particle dispersion, the coloring agent dispersion and the releasing agent dispersion include an aqueous medium. Examples of the aqueous medium include water such as distilled water and ion-exchanged water, and alcohols. These may be used alone, or two or more of them may be used jointly.

In the present invention, it is preferable that the abovementioned aqueous medium contains a surfactant.

Examples of the surfactants include anionic surfactants, such as sulfate ester salts, sulfonate salts, phosphate ester salts, and soaps, cationic surfactants, such as amine salts and quaternary ammonium salts, and nonionic surfactants such as polyethylene glycol types, alkylphenol/ethylene oxide adducts and polyvalent alcohols. Among these surfactants, anionic surfactants and cationic surfactants are preferable. The nonionic surfactant is used preferably in a combination with an anionic surfactant or cationic surfactant. These surfactants may be used singly or in a combination of two or more of them.

Examples of the anionic surfactant include fatty acid soaps such as potassium laurate, sodium oleate, and sodium castor oil; sulfate esters such as octyl sulfate, lauryl sulfate, lauryl ether sulfate, and nonyl phenyl ether sulfate; sulfonates such as lauryl sulfonate, dodecylbenzene sulfonate, triisopropylnaphthalene sulfonate, dibutylnaphthalene sulfonate, sodium alkylnaphthalene sulfonate, naphthalene sulfonate formalin condensate, monooctyl sulfosuccinate, dioctyl sulfosuccinate, lauric acid amide sulfonate, and oleic acid amide sulfonate; phosphate esters such as lauryl phosphate, isopropyl phosphate, nonyl phenyl ether phosphate; sulfosuccinates such as dialkyl sulfosuccinate such as sodium dioctyl sulfosuccinate, disodium lauryl sulfosuccinate, and disodium lauryl polyoxyethylene sulfosuccinate.

Specific examples of the foregoing cationic surfactant include amine salts such as laurylamine hydrochloride, stearylamine hydrochloride, oleylamine acetate, stearylamine acetate, and stearylaminopropylamine acetate; and quaternary ammonium salts such as lauryltrimethylammonium chloride, dilauryldimethylammonium chloride, distearylammonium chloride, distearyldimethylammonium chloride, lauryldihydroxyethylmethylammonium chloride, oleylbispolyoxyethylenemethylammonium chloride, lauroylaminopropyldimethylethylammonium ethosulfate, lauroylaminopropyldimethylhydroxyethylammonium perchlorate, alkylbenzenedimethylammonium chloride, and alkyltrimethylammonium chloride.

Examples of the nonionic surfactant include alkyl ethers such as polyoxyethylene octyl ether, polyoxyethylene lauryl ether, polyoxyethylene stearyl ether, and polyoxyethylene oleyl ether; alkyl phenyl ethers such as polyoxyethylene octyl phenyl ether, and polyoxyethylene nonyl phenyl ether; alkyl esters such as polyoxyethylene laurate, polyoxyethylene stearate, and polyoxyethylene oleate, alkylamines such as polyoxyethylene lauryl aminoether, polyoxyethylene stearyl aminoether, polyoxyethylene oleyl aminoether, polyoxyethylene soybean aminoether, and polyoxyethylene beef tallow aminoether; alkylamides such as polyoxyethylene lauric acid amide, polyoxyethylene stearic acid amide, and polyoxyethylene oleic acid amide; vegetable ethers such as polyoxyethylene castor oil ether, polyoxyethylene rapeseed oil ether; alkanolamides such as lauric acid diethanol amide, stearic acid diethanol amide, and oleic acid diethanol amide; sorbitan ester ethers such as polyoxyethylene sorbitan monolaurate, polyoxyethylene sorbitan monopalmitate, polyoxyethylene sorbitan monostearate, and polyoxyethylene sorbitan monooleate.

When the resin particle dispersion, the coloring agent dispersion and the releasing agent dispersion are mixed, a content of the coloring agent may be 50% by mass or less, preferably about 2 to 40% by mass. A content of the releasing agent may be 50% by mass or less, preferably about 2 to 40% by mass. Further, a content of the other components may be an extent that does not inhibit the object of the invention, is generally an extremely small amount, specifically, about 0.01 to 5% by mass, preferably about 0.5 to 2% by mass.

A producing method of other resin particle dispersion which can be used with resin particles of the invention is not particularly limited, but a process which has been appropriately selected depending on the purpose can be adopted. For example, the dispersion can be prepared as follows: when a resin in the resin particles is a homopolymer or a copolymer of a vinyl-based monomer (vinyl-based resin) such as vinyl ketones, a dispersion in which resin particles of a homopolymer or a copolymer of a vinyl-based monomer (vinyl based resin) are dispersed in an ionic surfactant can be prepared by emulsion-polymerizing or seed-polymerizing the vinyl-based monomer in an ionic surfactant.

When a resin in the resin particles is a resin other than a homopolymer or a copolymer of the vinyl-based monomer, if the resin is dissolved in an oily solvent having relatively low solubility in water, the dispersion can be prepared by dissolving the resin in the oily solvent, adding this solution together with the ionic surfactant and the high-molecular electrolyte to water, performing fine particle dispersion using a dispersing machine such as a homogenizer, and heating or decreasing a pressure to volatilize the oily solvent.

The coloring agent dispersion can be prepared, for example, by dispersing the coloring agent in an aqueous medium such as the surfactant. The releasing agent dispersion disperses the releasing agent together with an ionic surfactant, a high-molecular acid and a high-molecular electrolyte such as a high-molecular base in water. While this is heated to a melting point or higher, the releasing agent is finely-divided by applying intense shearing using a homogenizer or a pressure discharge-type dispersing machine, thereby, the coloring agent dispersion can be prepared. A dispersion in which the other components (particles) are dispersed can be prepared by dispersing the aforementioned other components in an aqueous medium such as the surfactant.

When resin particles, a coloring agent, and a releasing agent which are dispersed in the resin particle dispersion, the coloring agent dispersion, and the releasing agent dispersion, respectively, are composite particles containing components other than resin particles, components other than a coloring agent, and components other than a releasing agent, respectively, a dispersions in which these composite particles are dispersed can be prepared, for example, as follows: for example, they can be prepared by dissolving and dispersing respective components of the composite particles in a solvent, dispersing this together with an appropriate dispersant in water as described above, and heating or decreasing a pressure to remove the solvent, or performing mechanical shearing or electric adsorption onto a surface of a latex formed by emulsion polymerization or seed polymerization to fix thereon. These methods are effective in suppressing release of the coloring agent, or improving dependency of charging property of a toner for developing an electrostatic latent image on a coloring agent.

A means of the dispersion is not particularly limited, but examples include the known per se dispersing apparatus such as a rotation shear-type homogenizer, and a ball mill, a sand mill and a dynomill having media.

The aggregated particles can be prepared, for example, as follows: an ionic surfactant having polarity which is opposite to that of the aforementioned ionic surfactant (1) or an aqueous medium to which this is added and mixed (2) or a second dispersion containing the aqueous medium (at least one kind of resin particle dispersion, coloring agent dispersion and releasing agent dispersion) (3) is mixed into a first dispersion containing an aqueous medium to which the aforementioned ionic surfactant is added and mixed (at least one kind or resin dispersion, coloring agent dispersion and releasing dispersion). When this mixed solution is stirred using a stirring means, the resin particles are aggregated in a dispersion by action of an ionic surfactant, aggregated particles are formed due to resin particles, thereby, an aggregated particle dispersion is prepared.

The stirring means is not particularly limited, but can be appropriately selected from the known stirring apparatuses depending on the purpose. It is preferable that the mixing is performed at a temperature of a glass transition point of a resin contained in the mixed solution. When the mixing is performed under this temperature condition, aggregation can be performed in the stable state.

In the case of the (1) or (2), aggregated particles in which at least one kind of resin particles, a coloring agent and a releasing agent dispersed in the first dispersion is aggregated, are formed. In the case of the (3), aggregated particles in which at least one kind of resin particles, a coloring agent and a releasing agent dispersed in the second dispersion, and at least one kind of resin particles, a coloring agent and a releasing agent dispersed in the first dispersion are aggregated, are formed.

When the aggregated particles are formed, it is preferable that an ionic surfactant contained in a dispersion to which another dispersion is added, and an ionic surfactant contained in a dispersion to be added are made to have opposite polarity, balance of the polarity is shifted in advance, and this shift in balance is compensated. That is, it is preferable that an ionic surfactant contained in a solution to be added is added to an ionic surfactant contained in a solution to which another solution is added, so as to compensate for this shift in balance.

Generally, aggregation is difficult in some cases depending on a kind or polarity of the resin of resin particles, coloring agent and releasing agent, particles of a particular material are freed at aggregation, and a desired toner composition is not obtained in some cases. Specifically, since a polyolefin-based releasing agent such as polyethylene and polypropylene which are normally used in a toner has small polarity, and is extremely poor in compatibility with a resin of resin particles it remarkably tends to be freed at aggregation. When an amount of a freed releasing agent is increased, a problem arises that not only various properties inherent to a toner are deteriorated, but also the freed releasing agent is overflowed from a developing machine at development to stain the interior of the developing machine, and the freed releasing agent is destructed or coalesced due to a mechanical stress in a developing machine, filming on a developing sleeve.

However, when aggregated particles are formed as described above, such the problem is not incurred. For example, it is advantageous in that even when the resin in resin particles and the coloring agent have the same polarity, by adding a surfactant having opposite polarity, uniform aggregated particles can be easily formed from the resin particles and the coloring agent.

An average particle diameter of aggregated particles formed in this aggregation step is not particularly limited, but it is usually controlled so that the average particle diameter becomes approximately an average particle diameter of an intended toner for developing an electrostatic latent image. The controlling can be easily performed, for example, by appropriately setting or changing a temperature and conditions of mixing • stirring. By the aforementioned aggregation step, aggregated particles having an average particle diameter which is approximately the same as an average particle diameter of a toner for developing an electrostatic latent image is formed, and an aggregated particle dispersion in which the aggregated particles are dispersed is prepared. A content of aggregated particles in the aggregated particle dispersion is usually 40% by mass or smaller. In the invention, the aggregated particles are referred to as “mother particles” in some cases.

The adhering step can be performed as necessary, and is a step of adding a fine particle dispersion in which fine particles are dispersed to the aggregated particle dispersion, and mixing them to adhere the fine particles to the aggregated particles, to form aggregated particles.

Examples of the fine particles include resin fine particles from the resin particles, coloring agent fine particles from the coloring agent, releasing agent fine particles from the releasing agent, and fine particles from the other components (particles), which have been described above. Examples of the fine particle dispersion include a dispersion in which resin particles are dispersed, a coloring agent dispersion in which a coloring agent is dispersed, a releasing agent dispersion in which a releasing agent is dispersed, and a dispersion in which other components (particle) are dispersed, which have been described above. These fine particle dispersions may be used alone, or two or more of them may be used jointly.

When fine particles such as the resin particles are uniformly adhered to a surface of the aggregated particles to form adhered particles, and the adhered particles are heated and melted in a fusing step described later, in the case where the aggregated particles contain a coloring agent or a releasing agent, since a surface of them is covered with a material of the fine particles (shell is formed), exposure of these releasing agents from toner particles can be effectively prevented.

In this adhesion step, when the resin fine particles are used upon preparation of a multicolor toner for developing an electrostatic latent image, since a layer of the resin fine particles is formed on a surface of the aggregated particles, influence of a coloring agent contained in the aggregated particles on charging behavior can be minimized, and a difference in charging properties depending on a kind of a coloring agent can be made to be produced with difficulty. When a resin having a high glass transition point is selected as a resin in the resin fine particles, a toner for developing an electrostatic latent image which has both of thermal retainability and fixability and is excellent in electrostatic property can be prepared. In this adhesion step, when a releasing agent fine particle dispersion in which a releasing agent such as a wax as the fine particle is dispersed is added and this is mixed and, thereafter, a fine particle dispersion in which a resin or an inorganic powder having a high hardness as the fine particle is added and this is mixed, a shell composed of a resin or an inorganic powder having a high hardness can be formed on a superficialmost surface of toner particles. In this case, a wax can be made to exert effectively as a releasing agent at fixation while exposure of a wax is suppressed. By the above procedure, for example, a surface of toner particles can be covered with a resin, or can be covered with an charging controlling agent, and a coloring agent and a releasing agent can be present near a surface of toner particles.

An average particle diameter of the fine particles is preferably 1 μm or smaller, further preferably 0.01 to 1 μm. When the average particle diameter exceeds 1 μm, a particle diameter distribution of the finally obtained toner for developing an electrostatic latent image is widened, freed particles are generated, and reduction in performance and reliance is easily incurred. On the other hand, when the average particle diameter is within the aforementioned range, it is advantageous in that not only there is no defect described above, but also a layer structure composed of fine particles is formed. The average particle diameter can be measured, for example, using a microtrack.

A volume of the fine particles depends on a volume fraction of the resulting toner for developing an electrostatic latent image, and is preferably 50% or smaller of a volume of the resulting toner for developing an electrostatic latent image. When a volume of the fine particles exceeds 50% of a volume of the resulting toner for developing an electrostatic latent image, the fine particles are not adhered or aggregated to the aggregated particles, new aggregated particles composed of the fine particles are formed, variation in a composition distribution and a particle size distribution of the resulting toner for developing an electrostatic latent image becomes remarkable, and desired performance can not be obtained in some cases.

In the fine particle distribution, these fine particles may be dispersed alone to prepare a fine particle dispersion, or two or more kinds of fine particles may be used jointly, and dispersed to prepare a fine particle dispersion. In the case of the latter, a combination of fine particles to be used jointly is not particularly limited, but can be appropriately selected depending on the purpose.

Examples of a dispersing medium in the fine particle dispersion include the aforementioned aqueous medium. In the invention, it is preferable that at least one kind of the aforementioned surfactant is added to the aqueous medium, and this is mixed.

A content of the fine particles in the fine particle dispersion is usually 5 to 50% by mass, preferably 10 to 40% by mass. When the content is outside the aforementioned range, a structure and a composition from the interior to a surface of a toner for developing an electrostatic latent image are not sufficiently controlled in some cases.

The fine particle dispersion is prepared, for example, by dispersing at least one kind of the fine particles in an aqueous medium to which an ionic surfactant has been added, and this is mixed. Alternatively, the fine particle dispersion can be prepared by adsorbing or fixing it to a surface of a latex prepared by emulsification polymerization or seed polymerization by mechanical shear or electrically.

In this adhesion step, by adding the fine particle dispersion to an aggregated particle dispersion prepared in an aggregation step, and mixing them, the fine particles are adhered to a surface of the aggregated particles to form adhered particles. Since the fine particles corresponds to newly added particles seen from the aggregated particles, the fine particles is called "additional particles" in the invention in some cases.

The method of addition and mixing is not particularly limited, but for example, may be gradually performed continuously, or may be divided into plural times, and performed stepwise. Like this, by adding and mixing the fine particles (additional particles), occurrence of fine particles can be suppressed, and a particle size distribution of the resulting toner for developing an electrostatic latent image can be sharpened. In addition, a composition and physical property from a surface to the interior of the resulting toner for developing an electrostatic latent image can be changed stepwise, and a structure of a toner for developing an electrostatic latent image can be easily controlled.

Further, it is possible to secure the fluidity and storage stability together with the superior fixing property at a lower temperature of the toner by selecting the resin for the resin particles and the fine resin particles in such a way that the glass transition point of the resin present in the exterior of the toner particle is higher than the glass transition point of the resin present in the interior of the toner particle.

Also, it is possible to prevent the offset to the heat roll by increasing the elasticity in a fused state by increasing the molecular weight of the resin on the higher molecular weight side. This is a very effective means in the case where oil coating is not implemented.

Further, a molecular weight of a resin present outside a toner (i.e. resin in fine particles) is selected so as to be smaller than a molecular weight of a resin present in the interior of a toner (i.e. resin in aggregated particles) and, since smoothness of a surface of the resulting toner particles is enhanced, flowability and transference performance are easily improved. When the aggregated particles are not formed of one kind of resin fine particles, that is, when the aggregated particles are obtained by aggregating two or more kinds of resin particles, a molecular weight of a resin present in the interior of the toner (i.e. resin in aggregated particles) means an average value of molecular weights of all resins contained in the aggregated particles.

If the molecular weight of the resin present in the exterior of the toner particle differs extremely from the molecular weight of the resin present in the interior of the toner particle, the adhesion between the core and the coating layer of the obtained toner particle may decrease. In this case, the toner particles can be destroyed if a mechanical stress is applied to the toner particles by agitation or by blending thereof with carrier particles in a developing device. Accordingly, when the fine resin particles are adhered to the flocculated particles, it is possible to employ a procedure comprising firstly adhering fine resin particles, which have a molecular weight and/or glass transition point midway between those of the resin present in the exterior of the toner particle and those of the resin present in the interior of the toner particle, to the flocculated particles and thereafter adhering selected fine resin particles to the flocculate particles.

When addition and mixing are performed stepwise by dividing into plural times, it is advantageous in that layers of the fine particles are laminated stepwise on a surface of the aggregated particles, a structure change or a composition gradient can be formed from the interior to the outside of particles of a toner for developing an electrostatic latent image, physical property can be changed, and a surface hardness of particles can be improved. Moreover, at fusion in a fusing step, a particle size distribution can be maintained, and a variation thereof can be suppressed and, at the same time, addition of a surfactant and a base or an acid for enhancing stability at fusion becomes unnecessary, an amount of them to be added can be suppressed minimum, and saving of the cost and improvement in quality become possible.

Conditions of adhering the fine particles to the aggregated particles are as follows: that is, a temperature is a temperature of a glass transition point of a resin in resin particles in an aggregation step or lower, and is preferably about room temperature. When heated at a temperature of a glass transition point or lower, the aggregated particles and the fine particles are easily adhered and, as a result, formed adhered particles are easily stabilized. Since a treatment time depends on the temperature, the time can not be defined unconditionally, but is usually about 5 minutes to 2 hours. Upon the adhesion, a dispersion containing the aggregated particles and the fine particles may be allowed to stand, or may be mildly stirred with a mixer. The latter is advantageous in that uniform adhered particles are easily formed.

In the invention, this adhesion step may be performed once or plural times. In the case of the former, only one layer of the fine particles (additional particles) is formed on a surface of the aggregated particles, while in the latter, when two or more kinds of the fine particle dispersions are prepared, layers of fine particles (additional particles) contained in these fine particle dispersions are formed by lamination. In the case of the latter, a toner for developing an electrostatic latent image having a complicated and precise stepwise structure can be obtained, and it is advantageous in that desired function can be given to a toner for developing an electrostatic latent image.

When an adhesion step is performed plural times, fine particles (additional particles) which are first adhered to the aggregated particles (mother particles) and fine particles (additional particles) which are adhered next or later may be any combination, and can be appropriately selected depending on utility of a toner for developing an electrostatic latent image.

When an adhesion step is performed plural times, an aspect of heating a dispersion containing the fine particles and the aggregated particles at a temperature of a glass transition point of a resin in resin particles in an aggregation step or lower every addition and mixing of the fine particles is preferable, and an aspect of elevating this temperature of heating stepwise is more preferable. By doing this, it is advantageous in that adhered particles can be stabilized, and occurrence of freed particles can be suppressed.

By the aforementioned adhesion step, adhered particles in which the fine particles are adhered to aggregated particles prepared in the aggregation step are formed. When an adhesion step is performed plural times, adhered particles in which the fine particles are adhered to aggregated particles prepared in the aggregation step plural times are formed. Therefore, by adhering appropriately selected fine particles to the aggregated particles in an adhesion step, a toner for developing an electrostatic latent image having desired property can be freely designed and prepared. Since a distribution of the coloring agent in these adhered particles becomes finally a distribution of a coloring agent in toner particles, as a distribution of a coloring agent in the adhered particles is finer or more uniform, color developability of the resulting toner for developing an electrostatic latent image is improved.

The fusion step is a step of heating and fusing the aggregated particles, the adhered particles when the adhesion step is performed, to form toner particles.

A temperature of the heating may be a glass transition point temperature to a degradation temperature of the resin contained in the aggregated particles in the adhered particles, when the adhesion step is performed. Therefore, a temperature of the heating is different depending on a kind of a resin of the resin particles (and the fine particles), and can not be unconditionally defined, but is generally a glass transition point temperature of a resin to 180° C. contained in the aggregated particles, in the adhered particles when the adhesion step of a resin contained in aggregated particles is performed. By appropriately selecting a temperature of the heating, a shape of the resulting toner particles can be arbitrarily controlled from an indeterminate form to a spherical form. The heating can be performed using the known per se heating apparatus or equipment.

The fusion time is sufficient to be a short time when a temperature of the heating is high, and is necessary to be a long time when a temperature of the heating is low. That is, since the fusing time depends on a temperature of the heating, it can not be unconditionally defined, but is generally 30 minutes to 10 hours. In the invention, a toner for developing an electrostatic latent image obtained after completion of a fusion step may be washed and dried under appropriate condition. An inorganic powder such as silica, alumina, titania and calcium carbonate, or resin particles such as a vinyl-based resin, a polyester resin and a silicone resin may be added by applying a shearing force under dry condition. These inorganic powders or resin particles function as an external additive such as a flowability assistant or a cleaning assistant.

In the invention, it is preferable that fused particles are cooled at a rate described later after the aforementioned fusion in this fusion step. The reason is as follows: that is, it is known that a releasing agent containing at least one kind of an ester consisting of the higher alcohol of a carbon number of 12 to 30 and/or higher fatty acid of a carbon number of 12 to 30 has polymorphism phenomenon.

For example, E. S. Lutton in J. Am. Oil Chem. Soc., 27, 276 (1950) reports that there are a few kinds of polymorphisms, and they have different melting points, respectively.

Usually, in order to control melting points of these plural polymorphisms, heat treatment is most generally performed. As a result of study of this heat treatment condition, it was found out that, by cooling toner particles after fusion at 1 to 50° C./min., even the same releasing agent becomes possible to exhibit a high melting point. Since a melting point of a releasing agent is elevated by this cooling even using the same releasing agent, retainability of a toner becomes better. In the invention, a rate of the cooling is preferably 1 to 50° C./min., more preferably 5 to 50° C./min., particularly preferably 10 to 50° C./min. Even when the rate exceeds 50° C./min., the similar effect is seen, but it is disadvantageous in that it is necessary to enlarge facilities for cooling. On the other hand, when the rate is less than 1° C./min., it is disadvantageous in that it becomes difficult to elevate a melting point of a releasing agent.

By the aforementioned fusion step, the aggregated particles (mother particles) are fused and, when the adhesion step is performed, adhered particles prepared in the adhesion step are fused in the state where the fine particles (additional particles) are adhered to a surface of the aggregated particles, and a toner for developing an electrostatic latent image is prepared.

In the process for preparing a toner for developing an electrostatic latent image of the invention, since occurrence of a fine powder is not incurred during preparation of toner particles, it is advantageous in that it is not necessary to remove a fine powder produced at pulverization in a kneading-pulverizing method or material dispersion in a suspension polymerization method, and a step can be simplified. In addition, since toner particles are formed by fusing aggregates which are aggregated in the state where at least resin particles, a coloring agent and a releasing agent are uniformly dispersed, it is possible to control a composition of a toner for developing an electrostatic latent image uniformly. When at least two kinds of resin particles having different molecular weights are used via an adhesion step, it is possible to easily control a molecular weight distribution of a toner for developing an electrostatic latent image. In addition, since a material having high hydrophobicity like a releasing agent can be present selectively in the interior of toner particles, it is possible to decrease an amount of a releasing agent on a surface of toner particles.

The toner for developing an electrostatic latent image of the invention obtained by the aforementioned process for preparing a toner for developing an electrostatic latent image of the invention has, when the adhesion step is performed, a structure in which the aggregated particles are mother particles, and a covering layer of the fine particles (additional particles) is formed on a surface of the mother particles. The number of layers of the fine particles (additional particles) may be one, or two or more. Generally, the number of layers is the same as times of performance of the adhesion step in the aforementioned process for preparing a toner for developing an electrostatic latent image of the invention.

A molecular weight distribution expressed by a ratio (Mw/Mn) of a weight average molecular weight (Mw) and a number average molecular weight (Mn) measured using gel permeation chromatography in the toner for developing an electrostatic latent image of the invention is preferably 4 to 30, more preferably 4 to 20, particularly preferably 5 to 15. When a molecular weight distribution expressed by the ratio (Mw/Mn) exceeds 30, transparency, smoothness and color mixability of a fixed image are not sufficient. In particular, when a toner for developing an electrostatic latent image is developed or fixed on a film, an image shown by transmission of light becomes an unclear and dark image, or a not transmittable and not developing projected image. When the molecular weight distribution is less than 4, reduction in a viscosity of a toner at high temperature fixation becomes remarkable, and offset easily occurs. On the other hand, when a molecular weight distribution expressed by the ratio (Mw/Mn) is within the aforementioned numerical range, not only transparency, smoothness and color mixability of a fixed image are sufficient, but also reduction in a viscosity of a toner for developing an electrostatic latent image at high temperature fixation can be prevented, and occurrence of offset can be effectively suppressed.

The toner for developing an electrostatic latent image of the invention is excellent in various properties such as charging property, developability, transferability, fixability and cleanability, in particular, smoothness, transparency, color mixability, and color developability in an image. In addition, since the various performances are stably exerted and maintained without undergoing influence of environmental conditions, reliance is high.

Since the toner for developing an electrostatic latent image of the invention is prepared by the process for preparing a toner for developing an electrostatic latent image of the invention, an average particle diameter thereof is small, and a particle size distribution thereof is sharp different from preparation by a kneading-pulverizing method.

In a particle size distribution of the toner for developing an electrostatic latent image of the invention, as its index, using D16 or D84 of an accumulation distribution, volume GSD (volume GSD=(volume D84/volume D16)$^{0.5}$) or number GSD (number GSD=(number D84/number D16)$^{0.5}$) can be simply used. As the volume GSD, 1.3 or smaller is preferable, and 1.27 or smaller is more preferable. When the volume GSD exceeds 1.30, developability is worsened with time in some cases by selection developing. An average particle diameter of the toner for developing an electrostatic latent image is preferably 2 to 9 μm, more preferably 3 to 8 μm. When the average particle diameter is less than 2 μm, electrification property easily becomes insufficient, and developability is reduced in some cases. When the average particle diameter exceeds 9 μm, resolution of an image is reduced in some cases.

Since the toner for developing an electrostatic latent image of the invention is prepared using resin particles of the invention, a remaining solvent is not contained in the toner. As a result, the toner for developing an electrostatic latent image of the invention can improve retainability of a toner and stability of a fixed image and, further, occurrence of an offensive smell derived from a remaining solvent at toner fixation can be suppressed.

An charging amount of the toner for developing an electrostatic latent image of the invention is preferably 10 to 40 μC/g, more preferably 15 to 35 μC/g. When the charging amount is less than 10 μC/g, background stain easily occurs and, when the charging amount exceeds 40 μC/g, reduction in an image concentration easily occurs. A ratio of a charging amount in summer and a charging amount in winter of this toner for developing an electrostatic latent image is preferably 0.5 to 1.5, more preferably 0.7 to 1.3. When the ratio is outside the aforementioned preferable range, dependency of a toner on environment is intense, stability of charging property is deficient, and this is not practically preferable in some cases.

<Electrostatic Latent Image Developer>

The electrostatic latent image developer of the invention contains at least the toner for developing an electrostatic latent image of the invention. The electrostatic latent image developer of the invention has not particularly a limitation except that it contains the toner for developing an electrostatic latent image of the invention, and an appropriate component composition can be taken depending on the purpose. The electrostatic latent image developer of the invention is prepared as a one-component electrostatic latent image developer when the toner for developing an electrostatic latent image of the invention is used alone, or as a two-component electrostatic latent image developer when the toner is used by combining with a carrier.

The carrier is not particularly limited, but examples include the known per se carriers. For example, the known carriers such as resin-covered carriers described in JP-A No. 62-39879 and JP-A No. 56-11461 can be used.

Specific examples of the carrier include the following resin-covered carriers. That is, examples of core particles of the carrier include shaped products of normal iron powder, ferrite and magnetite, and an average particle diameter thereof is about 20 to 200 μm. Examples of a covering resin for the core particles include styrenes such as styrene, parachlorostyrene, and α-methylstyrene, α-methylene fatty acid monocarboxylic acids such as methyl acrylate, ethyl acrylate, n-propyl acrylate, lauryl acrylate, 2-ethylhexyl acrylate, methyl methacrylate, n-propyl methacrylate, lauryl methacrylate, and 2-ethylhexyl methacrylate, nitrogen-containing acryls such as dimethylaminoethyl methacrylate, vinylnitriles such as acrylonitrile, and methacrylonitrile, vinylpyridines such as 2-vinylpyridine, 4-vinylpyridine, vinylethers such as vinyl methyl ether, and vinyl isobutyl ether, vinyl ketones such as vinyl methyl ketone, vinyl ethyl ketone, and vinyl isopropenyl ketone, polyolefins such as ethylene and propylene, silicones such as methylsilicone, and methylphenylsilicone, copolymers of a vinyl-based fluorine-containing monomer such as fluorinated vinylidine, tetrafluoroethylene, and hexafluoroethylene, polyesters containing bisphenol or glycol, epoxy resin, polyurethane resin, polyamide resin, cellulose resin, and polyether resin.

These resins may be used alone, or two or more kinds of them may be used jointly. An amount of the covering resin is about 0.1 to 10 parts by mass, preferably 0.5 to 3.0 parts by mass relative to a carrier. For preparing the carrier, a heating-type kneader, a heating-type Henschel mixer, and a UM mixer can be used, or a heating-type fluidized rolling bed, and a heating-type kiln can be used depending on an amount of the covering resin.

A ratio of mixing the toner for developing an electrostatic latent image of the invention, and a carrier in the electrostatic latent image developer of the invention is not particularly limited, but can be appropriately selected depending on the purpose.

<Image Forming Method>

The image forming method of the invention comprises a latent image forming step of forming an electrostatic latent image on a surface of a latent image bearing body, a developing step of developing an electrostatic latent image formed on a surface of the latent image bearing body to form a toner image, a transferring step of transferring a toner image formed on a surface of the latent image bearing body to a surface of a subject to be transferred, and a fixing step of thermally fixing a toner image transferred to a surface of the subject to be transferred, and the electrostatic latent image developer of the invention is used as the aforementioned developer.

The aforementioned respective steps themselves are general steps, and are described, for example, in JP-A No. 56-40868, and JP-No. 49-91231. The image forming method of the invention can be performed by the known per se image forming apparatus such as copying machine and facsimile machine.

The latent image forming step is a step of forming an electrostatic latent image on a surface of a latent image bearing body. The developing step is a step of developing the electrostatic latent image with a developer layer on a developer carrier to form a toner image. The developer layer is not particularly limited as far as it contains the electrostatic latent image developer of the invention containing the toner for developing an electrostatic latent image of the invention. The transference step is a step of transferring the toner image onto a subject to be transferred. Further, a toner image transferred onto a surface of a subject to be transferred is thermally fixed with a fixing machine, and the final toner image is formed (fixing step). Upon thermal fixation with the fixing machine, a releasing agent is usually supplied to a fixing member in the fixing machine in order to prevent offset.

It is preferable that the image forming method of the invention further comprises a cleaning step of recovering a remaining toner on a surface of the latent image bearing body, and a recycling step of conveying a remaining toner recovered in the cleaning step to the developer carrier, after the transferring step. The cleaning step is a step of removing an electrostatic latent image developer remaining on a surface of a latent image bearing body. The recycling step is a step of moving a remaining toner recovered in the cleaning step to a developer layer of the developer carrier.

An image forming method of an aspect comprising this recycling step can be performed by using an image forming apparatus such as a toner recycle system-type copying machine, and a facsimile machine. Alternatively, this can be also applied to a recycle system of an aspect of omitting a cleaning step and recovering a toner at the same time with developing.

EXAMPLES

The invention will be explained in further detail below based on Examples, but the invention is not limited by these Examples at all. Hereinafter, "part" means a part by mass.

An average particle diameter of a toner for developing an electrostatic latent image was measured using a Coulter counter (trade name: TA2 type, manufactured by Coulter). An average particle diameter of resin particles, a coloring agent, and a releasing agent was measured using a laser diffraction-type particle size distribution measuring apparatus (trade name: LA-700, manufactured by Horiba, Ltd.).

Further, an electrostatic latent image developer was assessed by forming an image using a modified Docu Centre Color 500CP machine manufactured by Fuji Xerox Co., Ltd., and observing image quality (deviation in solid melt) and background stain at an initial stage and at 50000th paper with naked eyes. Assessment criteria are as follows.

Assessment Criteria of Image Quality (Deviation in Solid Melt)

a: When a solid part of a fixed image is observed with naked eyes, a luster part and a non-luster part (a part having a low gloss) can not be discriminated, or they are uniform, and there is no uncomfortable feeling between a luster part and a non-luster part.

c: Clearly, areas of a luster part and a non-luster part are remarkable, and there is uncomfortable feeling.

Assessment Criteria of Background Stain a: Toner adhesion can not be discriminated with naked eyes.

c: Toner stain is remarkable with naked eyes, and there is uncomfortable feeling relative to a color of a paper.

A modified Docu Centre Color500CP machine manufactured by Fuji Xerox Co., Ltd. is an apparatus which can practice the image forming method of the invention.

Assessment obtained in Examples and Comparative Examples is summarized in Table 1.

Example 1

Preparation of Resin Particle Dispersion (1)

| | |
|---|---|
| γ-Decanolactone | 200 Parts |
| Scandium triflate | 2 Parts |
| Styrene | 100 Parts |
| Butyl acrylate | 100 Parts |
| Acrylic acid | 4 Parts |
| AIBN (azobisisobutyronitrile) | 10 Parts |

The above components (all manufactured by Wako Pure Chemical Industries, Ltd.) were mixed, and dissolved, this was dispersed into a solution in which 8 parts of a nonionic surfactant (trade name: Nonipol 85, manufactured by Sanyo Chemical Industries Ltd.) and 10 parts of an anionic surfactant (trade name: Neogen SC, manufactured by Dai-ichi Kogyo Seiyaku Co., Ltd.) were dissolved in 582 parts of ion-exchanged water, in a flask, this was emulsified so that an average particle diameter became 1 μm or smaller, and lactone ring opening polymerization was performed at a reaction temperature of 50° C. for 15 hours. Then, nitrogen replacement was performed while the materials were mixed slowly for 10 minutes, the flask was heated with an oil bath until the content became 70° C. under stirring, and emulsion polymerization was continued as it was for 7 hours to prepare a resin particle dispersion (1).

Example 2

Preparation of Resin Particle Dispersion (2)

| | |
|---|---|
| Cyclopentadecanolide | 200 Parts |
| Lipase (derived from Pseudomonas genus organism) | 50 Parts |
| Styrene | 100 Parts |
| Butyl acrylate | 100 Parts |
| Acrylic acid | 4 Parts |
| AIBN | 10 Parts |

The above components (all manufactured by Wako Pure Chemical Industries Ltd.) were mixed and dissolved, this was dispersed in absolution in which 8 parts of a nonionic surfactant (trade name: Nonipol 85, manufactured by Sanyo Chemical Industries Ltd.) and 10 parts of an anionic surfactant (trade name: Neogen SC, manufactured by Dai-ichi Kogyo Seiyaku Co., Ltd.) were dissolved in 582 parts of ion-exchanged water, in a flask, this was emulsified so that an average particle diameter became 1 μm or smaller, and lactone ring opening polymerization was performed at a reaction temperature of 50° C. for 50 hours. Then, nitrogen replacement was performed while the materials were mixed slowly for 10 hours, the flask was heated with an oil bath until the content became 70° C. under stirring, and emulsion polymerization was continued as it was for 7 hours to prepare a resin particle dispersion (2).

Example 3

Preparation of Resin Particle Dispersion (3)

| | |
|---|---|
| Cyclopentadecanolide | 200 Parts |
| Trimellitic acid | 5 Parts |
| Scandium triflate | 2 Parts |
| Styrene | 100 Parts |
| Butyl acrylate | 100 Parts |
| Acrylic acid | 4 Parts |
| AIBN | 10 Parts |

The above components (all manufactured by Wako Pure Chemical Industries Ltd.) were mixed and dissolved, this was dispersed in a solution in which 8 parts of a nonionic surfactant (trade name: Nonipol 85, manufactured by Sanyo Chemical Industries Ltd.) and 10 parts of an anionic surfactant (trade name: Neogen SC, manufactured by Dai-ichi Kogyo Seiyaku Co., Ltd.) were dissolved in 582 parts of ion-exchanged water, in a flask, this was emulsified so that an average particle diameter became 1 μm or smaller, and lactone ring opening polymerization was performed at a reaction temperature of 50° C. for 15 hours. Then, nitrogen replacement was performed while the materials were mixed slowly for 10 hours, the flask was heated with an oil bath until the content became 70° C. under stirring, and emulsion polymerization was continued as it was for 7 hours to prepare a resin particle dispersion (3).

Comparative Example 1

Preparation of Comparative Resin Particle Dispersion (1)

| | |
|---|---|
| Cyclopentadecanolide | 200 Parts |
| Organotin catalyst | 10 Parts |

The above components were placed into a flask, and reacted at a reaction temperature of 100° C. for 10 hours while the materials were mixed and stirred, to synthesize a resin.

Then, into this flask were mixed:

| | |
|---|---|
| Styrene | 100 Parts |
| Butyl acrylate | 100 Parts |
| Acrylic acid | 4 Parts |
| AIBN | 100 Parts |

The above components (all manufactured by Wako Pure Chemical Industries, Ltd.) were mixed and dissolved, this was dispersed in a solution obtained by adding 8 parts of a nonionic surfactant (trade name: Nonipol 85, manufactured by Sanyo Chemical Industries, Ltd.) and 10 parts of an anionic surfactant (trade name: Neogen SC, manufactured by Dai-ichi Kogyo Seiyaku Co., Ltd.) to 582 parts of ion-exchanged water, and this was emulsified with a rotor stator-type homogenizer (trade name: Ultraturrax, manufactured by IKA) so that an average particle diameter became 1 μm or smaller. Thereafter, nitrogen replacement was performed while the materials were mixed slowly for 10 minutes, the flask was heated with an oil bath until the content became 70° C. under stirring, and emulsion polymerization was continued as it was for 7 hours to prepare a comparative resin particle dispersion (1).

Example 4

Preparation of Toner for Developing Electrostatic Latent Image (1)

—Preparation of Coloring Agent Dispersion (1)—

| | |
|---|---|
| Phthalocyanine pigment (trade name: PV FIRST BLUE, manufactured by Dainichiseika Color & Chemicals Mfg. Co., Ltd.) | 60 Parts |
| Anionic surfactant (trade name: Ionet D-2, manufactured by Sanyo Chemical Industries, Ltd.) | 2 Parts |
| Ion-exchanged water | 300 Parts |

The above components were mixed, dissolved, dispersed using a homogenizer (trade name: Ultraturrax T50, manufactured by IKA), to prepare a coloring dispersion (1) in which a coloring agent (phthalocyanine pigment) having an average particle diameter was dispersed.

—Preparation of Releasing Agent Dispersion (1)—

| | |
|---|---|
| Behenic acid ester of pentaerythritol (trade name: Rikestar EW-861, HLB = 3.2, manufactured by Riken Vitamin Co., Ltd.) | 100 Parts |
| Anionic surfactant (trade name: Neogen SC, manufactured by Dai-ichi Kogyo Seiyaku Co., Ltd.) | 6 Parts |
| Ion-exchanged water | 1000 Parts |

The above components were heated to 90° C., dispersed using a homogenizer (trade name: Ultraturrax T50, manufactured by IKA), and suspension-treated with a pressure discharge-type homogenizer to prepare a releasing agent suspension (1) in which a releasing agent (behenic acid ester of pentaerythritol) having an average particle diameter of 330 nm was dispersed.

—Preparation of Aggregated Particles (Aggregation Step)—

| | |
|---|---|
| Resin particle dispersion (1) | 240 Parts |
| Coloring agent dispersion (1) | 40 Parts |
| Releasing agent dispersion (1) | 100 Parts |
| Cationic surfactant (trade name: Sanizol B50, manufactured by Kao Corporation) | 2 Parts |
| Ion-exchanged water | 300 Parts |

The above components were placed into a round-type stainless flask, dispersed using a homogenizer (trade name: Ultraturrax T50, manufactured by IKA), and heated to 47° C. in a heating oil bath. After the flask was retained at 47° C. for 30 minutes, this was observed with a light microscope, and it was confirmed that aggregated particles having an average particle diameter of about 5.1 μm were formed.

—Preparation of Adhered Particles (Adhesion Step)—

To this aggregated particle dispersion was mildly added 50 parts of a resin particle dispersion (1) as a resin fine particle dispersion, and a temperature of the heating oil bath was elevated, and retained at 48° C. for 1 hour. This was observed with a light microscope, and it was confirmed that adhered particles having an average particle diameter of about 5.5 μm were formed.

—Fusion of Adhered Particles (Fusion Step)—

To this was added 6 parts of an anionic surfactant (trade name: Neogen SC, manufactured by Dai-ichi Kogyo Seiyaku Co., Ltd.), and this was heated to 94° C. while stirring was continued, and retained for 5 hours. Thereafter, after cooled at a rate of 10° C./min., the reaction product was filtered, washed with ion-exchanged water well, and dried using a vacuum drier to obtain a toner for developing an electrostatic latent image (1).

An average particle diameter of the resulting toner for developing an electrostatic latent image (1) was 5.7 μm. One part of colloidal silica (trade name: R972, manufactured by Aerosil) was externally added to 100 parts of the resulting toner for developing an electrostatic latent image (1), and this was mixed using a Henschel mixer to obtain an externally added toner for developing an electrostatic latent image (1).

<Preparation of Electrostatic Latent Image Developer (1)>

100 Parts of ferrite particles (manufactured by Powder-Tech Co., Ltd.; average particle diameter 50 μm) and 1 part of a methacrylate resin (manufactured by Mitsubishi Rayon Co., Ltd.; molecular weight 95000) together with 500 parts of toluene were placed into a pressure-type kneader, the materials were mixed at a normal temperature for 5 minutes, a temperature was elevated to 70° C. while they were mixed under reduced pressure, toluene was distilled off, and this was cooled, and classified using a 105 μm sieve to obtain a ferrite carrier (resin-covered carrier). This ferrite carrier and an externally added toner for developing an electrostatic latent image (1) were mixed to prepare a two-component electrostatic latent image developer (1) having a toner concentration of 7% by mass. Image formation was performed using an electrostatic latent image developer (1) as described above, and image quality was assessed.

Example 5

Preparation of Toner for Developing Electrostatic Latent Image (2)

—Preparation of Aggregated Particles (Aggregation Step)—

| | |
|---|---|
| Resin particle dispersion (2) | 250 Parts |
| Coloring agent dispersion (1) | 40 Parts |
| Releasing agent dispersion (1) | 130 Parts |
| Cationic surfactant (trade name: Kotamine 24P, manufactured by Kao Corporation) | 5 Parts |
| Ion-exchanged water | 300 Parts |

The above components were placed into a round-type stainless flask, dispersed using a homogenizer (trade name: Ultraturrax T50, manufactured by IKA), and heated to 48° C. in a heating oil bath. After retained at 48° C. for 30 minutes, this was observed with a light microscope, and it was confirmed that aggregated particles having an average particle diameter of about 5.0 μm were formed.

—Preparation of Adhered Particles (Adhesion Step)—

To this aggregated particle dispersion was mildly added 50 parts of a resin particle dispersion (2) as a resin fine particle dispersion, and a temperature of a heating oil bath was elevated, and retained at 51° C. for 1 hour. This was observed with a light microscope, and it was confirmed that adhered particles having an average particle diameter of about 5.3 μm were formed.

—Fusion of Adhered Particles (Fusion Step)—

To this was added 7 parts of an anionic surfactant (trade name: Neogen SC, manufactured by Dai-ichi Kogyo Seiyaku Co., Ltd.), and this was heated to 90° C. while stirring was continued, and retained for 5 hours. Thereafter, after cooled to room temperature at a rate of 40° C./min., the reaction product was filtered, washed with ion-exchanged water well, and dried using a vacuum drier to obtain a toner for developing an electrostatic latent image (2).

An average particle diameter of the resulting tone for developing an electrostatic latent image (2) was 5.6 μm. One part of colloidal silica (trade name: R972, manufactured by Aerosil) was externally added to 100 parts of the resulting toner for developing an electrostatic latent image (2), and the materials were mixed using a Henschel mixer to obtain an externally added toner for developing an electrostatic latent image (2).

According to the same manner as that of Example 4 except that an externally added toner for developing an electrostatic latent image (2) was used, an electrostatic latent image developer (2) was prepared. Image formation was performed using an electrostatic latent image developer (2) as described above, and image quality was assessed.

Example 6

Preparation of Toner for Developing Electrostatic Latent Image (3)

—Preparation of Aggregated Particles (Aggregation Step)—

| | |
|---|---|
| Resin particle dispersion (3) | 250 Parts |
| Coloring agent dispersion (1) | 40 Parts |
| Releasing agent dispersion (1) | 130 Parts |
| Cationic surfactant (trade name: Kotamine 24P, manufactured by Kao Corporation) | 5 Parts |
| Ion-exchanged water | 300 Parts |

The above components were placed into a round-type stainless flask, dispersed using a homogenizer (trade name: Ultraturrax T50, manufactured by IKA), and heated to 48° C. in a heating oil bath. After retained at 48° C. for 30 minutes, this was observed with a light microscope, and it was confirmed that aggregated particles having an average particle diameter of about 5.0 μm were formed.

—Preparation of Adhered Particles (Adhesion Step)—

To this aggregated particle dispersion was mildly added 50 parts of a resin particle dispersion (3) as a resin fine particle dispersion, and a temperature of a heating oil bath was elevated, and retained at 51° C. for 1 hour. This was observed with a light microscope, and it was confirmed that adhered particles having an average particle diameter of about 5.3 μm were formed.

—Fusion of Adhered Particles (Fusion Step)—

To this was added 7 parts of an anionic surfactant (trade name: Neogen SC, manufactured by Dai-ichi Kogyo Seiyaku Co., Ltd.), and the materials were heated to 90° C. while stirring was continued, and retained for 5 hours. Thereafter, after cooled to room temperature at a rate of 40° C./min., the reaction product was filtered, washed with ion-exchanged water well, and dried using a vacuum drier to obtain a toner for developing an electrostatic latent image (3).

An average particle diameter of the resulting toner for developing an electrostatic latent image (3) was 5.3 μm. One part of colloidal silica (trade name: R972, manufactured by Nippon Aerosil) was externally added to 100 parts of the resulting toner for developing an electrostatic latent image (3), the materials were mixed using a Henschel mixer to obtain an externally added toner for developing an electrostatic latent image (3).

According to the same manner as that of Example 4 except that an externally added toner for developing an electrostatic latent image (3) was used, an electrostatic latent image developer (3) was prepared. Image formation was performed using an electrostatic latent image developer (3) as described above, and image quality was assessed.

Comparative Example 2

Preparation of Comparative Toner for Electrostatic Latent Image (1)

—Preparation of Aggregated Particles (Aggregation Step)—

| | |
|---|---|
| Comparative resin particle dispersion (1) | 250 Parts |
| Coloring agent dispersion (1) | 40 Parts |
| Releasing agent dispersion (1) | 40 Parts |
| Cationic surfactant (trade name: Sanizol B50, manufactured by Kao Corporation) | 5 Parts |
| Ion-exchanged water | 300 Parts |

The above components were placed into a round-type stainless flask, dispersed using a homogenizer (trade name: Ultraturrax T50, manufactured by IKA), and heated to 49° C. in a heating oil bath. After retained at 49° C. for 20 minutes, this was observed with a light microscope, and it was confirmed that aggregated particles having an average particle diameter of about 5.0 μm were formed.

—Preparation of Adhered Particles (Adhesion Step)—

To this aggregated particle dispersion was mildly added 70 parts of a comparative resin particle dispersion (1) as a resin fine particle dispersion, and a temperature of a heating oil bath was elevated, and retained at 50° C. for 1 hour. This was observed with a light microscope, and it was confirmed that adhered particles having an average particle diameter of about 5.4 μm were formed.

—Fusion of Adhered Particles (Fusion Step)—

To this was added 7 parts of an anionic surfactant (trade name: Neogen SC, manufactured by Dai-ichi Kogyo Seiyaku Co., Ltd.), and the materials were heated to 97° C. while stirring was continued, and retained for 5 hours. Thereafter, after cooled to room temperature at a rate of 20° C./min., the reaction product was filtered, washed with ion-exchanged water well, and dried at 40° C. for 10 hours using a vacuum drier to obtain a comparative toner for developing an electrostatic latent image (1).

An average particle diameter of the resulting comparative toner for developing an electrostatic latent image (1) was 5.7 μm. One part of colloidal silica (trade name: R972, manufactured by Nippon Aerosil) was externally added to 100 parts of the resulting comparative toner for developing an electrostatic latent image (1), and the materials were mixed using a Henschel mixer to obtain a comparative externally added toner for developing an electrostatic latent image (1).

According to the same manner as that of Example 4 except that a comparative externally added toner for developing an electrostatic latent image (1), a comparative electrostatic latent image developer (1) was prepared. Image formation was performed using the comparative electrostatic latent image developer (1) as described above, and image quality was assessed.

TABLE 1

| | Image quality assessment (deviation in solid melting) | | Background stain | |
|---|---|---|---|---|
| | Initial (10th paper) | 50,000 th paper | Initial (10th paper) | 50,000th paper |
| Toner for developing electrostatic latent image (1) (Example 4) | a | a | a | a |
| Toner for developing electrostatic latent image (2) (Example 5) | a | a | a | a |
| Toner for developing electrostatic latent image (3) [Example 6) | a | a | a | a |
| Comparative toner for developing electrostatic latent image (1) Comparative Example (2) | a | c | a | c |

From results shown in Table 1, the following is clear. That is, electrostatic latent image developers (1) to (3) have small deviation in solid melting, are excellent in uniformity, and cause a fog with difficulty in image quality as compared with the comparative electrostatic latent image developer (1). In addition, they are also better in image quality stability.

In the following Examples, a molecular weight and a molecular weight distribution of a resin in polyester resin particles and a toner for developing an electrostatic latent image were measured using gel permeation chromatography (trade name: HLC-8120 GPC, manufactured by Tosoh Corporation).

A glass transition point of a resin in polyester resin particles and a toner for developing an electrostatic latent image was measured under a temperature raising rate of 3° C./min. using a differential scanning calorimeter (trade name: DSC-50, manufactured by Shimadzu Corporation).

Further, assessment of an electrostatic latent image developer was performed by forming an image using a modified Docu Centre Color 500CP machine manufactured by Fuji Xerox Co., Ltd., and observing initial image quality, and background stain of an image obtained at 50000th paper with naked eyes. Assessment criteria are as follows:

a: Toner adhesion is not discriminated with naked eyes.

b: Toner stain is slightly remarkable with naked eyes, and there is little uncomfortable feeling relative to a color of a paper.

c: Toner stain is remarkable with naked eyes, and there is uncomfortable feeling relative to a color of a paper.

Total assessment of an electrostatic latent image developer was performed. Assessment criteria are as follows:

a: Polyester resin particles can be synthesized at a low temperature, and stain at image background is not present, or is not remarkable.

c: Polyester resin particles can not be synthesized at a low temperature.

Assessment obtained in Examples and Comparative Examples is summarized in Table 2.

Example 7

Preparation of Resin Particle Dispersion (4)

—Preparation of Polyester Resin (1)—

| | |
|---|---|
| Sebacic acid | 789.0 Parts |
| Ethylene glycol | 310.5 Parts |
| Sodium isophthalate-5-sulfonate | 199.7 Parts |
| Fumaric acid | 40.7 Parts |
| Dibutyltin | 2.0 Parts |

The above components (all manufactured by Wako Pure Chemical Industries, Ltd.) were mixed in a flask, and heated to 240° C. under reduced atmosphere to perform dehydration condensation for 6 hours to obtain a polyester resin (1).

—Preparation of Polyester Resin Particles (1)—

| | |
|---|---|
| Polyester resin (1) | 60 Parts |
| γ-Decanolactone | 40 Parts |
| Scandium Triphlate | 2 Parts |

The above components (all except for polyester resin (1) manufactured by Wako Pure Chemical Industries, Ltd.) were mixed and dissolved, this was forcibly emulsified and dispersed into a solution in which 4 parts of a nonionic surfactant (trade name: Nonipol 85, manufactured by Sanyo Chemical Industries, Ltd.) and 5 parts of an anionic surfactant (trade name: Neogen SC, manufactured by Dai-ichi Kogyo Seiyaku Co., Ltd.) were dissolved in 250 parts of ion-exchanged water, using Ultraturrax (manufactured by IKA Japan) in a flask, thereafter, the suspension was emulsification-adjusted with a nanomizer (manufactured by Yoshida Kikai Co., Ltd.) so that an average particle diameter became 1 μm or smaller, and lactone ring opening polymerization was performed at a reaction temperature of 60° C. for 15 hours to obtain a resin particle dispersion (4) in which polyester resin particles (1) were dispersed.

Example 8

Preparation of Resin Particle Dispersion (5)

—Preparation of Polyester Resin (2)—

| | |
|---|---|
| Polyester resin (1) | 50 Parts |
| Cyclopentadecanolide | 50 Parts |
| Lipase (derived from *Pseudomonas* genus organism) | 20 Parts |

The above components were mixed and the resin particle dispersion (5) in which polyester resin particles (2) were dispersed was obtained, as the manufacture of polyester resin particle dispersion (1) in Example 1.

Example 9

Preparation of Resin Particle Dispersion (6)

—Preparation of Polyester Resin (3)—

| | |
|---|---|
| Polyester resin (1) | 50 Parts |
| Trimellitic acid | 1 Part |
| Cyclopentadecanolide | 50 Parts |
| Scandium tiflate | 2 Parts |

The above components (all manufactured by Wako Pure Chemical Industries Ltd. except polyester resin (1)) were mixed and dissolved, this was dispersed in a solution in which 4 parts of a nonionic surfactant (trade name: Nonipol 85, manufactured by Sanyo Chemical Industries Ltd.) and 5 parts of an anionic surfactant (trade name: Neogen SC, manufactured by Dai-ichi Kogyo Seiyaku Co., Ltd.) were dissolved in 250 parts of ion-exchanged water, in a flask, this was emulsified with Nanomizer (manufactured by Yoshida Kikai Kokyo) so that an average particle diameter became 1 μm or smaller, and lactone ring opening polymerization was performed at a reaction temperature of 60° C. for 12 hours. The resin particle dispersion (6) in which polyester resin particles (3) were dispersed was obtained.

Comparative Example 3

Preparation of Comparative Resin Particle Dispersion (2)

—Preparation of Comparative Polyester Resin Particles (1)—

| | |
|---|---|
| Polyester resin (1) | 50 Parts |
| Cyclopentadecanolide | 50 Parts |
| Organotin catalyst | 0.5 Part |

The above components were placed into a flask, reacted at a reaction temperature of 160° C. for 3 hours while the materials were mixed and stirred, and cooled to synthesize a resin.

Then, this resin was finely-divided into an average particle diameter of 20 μm using a mechanical pulverizing machine. It was difficult to finely-divide into 1 μm or smaller. For this reason, then, this was dispersed into a solution in which 2 parts of a nonionic surfactant (trade name: Nonipol 85, manufactured by Sanyo Chemical Industries, Ltd.) and 1 part of an anionic surfactant (trade name: Neogen SC, manufactured by Dai-ichi Kogyo Seiyaku Co., Ltd.) were dissolved in 200 parts of ion-exchanged water, and an average particle diameter was adjusted to be 1 μm or smaller under heating (160° C.) condition at a pressure of 130 MPa using a nanomizer heating system, to obtain a comparative resin particle dispersion (2) in which comparative polyester resin particles (1) were dispersed.

Example 10

Preparation of Toner for Developing Electrostatic Latent Image (4)

—Preparation of Aggregated Particles (Aggregation Step)—

| | |
|---|---|
| Resin particle dispersion (4) | 240 Parts |
| Coloring agent dispersion (1) | 40 Parts |
| Releasing agent dispersion (1) | 100 Parts |
| Cationic surfactant | 2 Parts |
| (trade name: Sanizol B50, manufactured by Kao Corporation) | |
| Ion-exchanged water | 300 Parts |

The above components were placed into a round-type stainless flask, dispersed using a homogenizer (trade name: Ultraturrax T50, manufactured by IKA), and heated to 47° C. in a heating oil bath. After retained at 47° C. for 30 minutes, this was observed with a light microscope, and it was confirmed that aggregated particles having an average particle diameter of about 5.1 μm were formed.

—Preparation of Adhered Particles (Adhesion Step)—

To this aggregated particle dispersion was mildly added 50 parts of a resin particle dispersion (4) as a resin fine particle dispersion, and a temperature of a heating oil bath was elevated, and retained at 48° C. for 1 hour. This was observed with a light microscope, and it was confirmed that adhered particles having an average particle diameter of about 5.5 μm were formed.

—Fusion of Adhered Particles (Fusion Step)—

To this was added 6 parts of an anionic surfactant (trade name: Neogen SC, manufactured by Dai-ichi Kogyo Seiyaku Co., Ltd.), and the materials were heated to 94° C. while stirring was continued, and retained for 5 hours. Thereafter, after cooled at a rate of 10° C./min., the reaction product was filtered, washed with ion-exchanged water well, and dried using a vacuum drier to obtain a toner for developing an electrostatic latent image (4).

An average particle diameter of the resulting toner for developing an electrostatic latent image (4) was 5.7 μm. One part of colloidal silica (trade name: R972, manufactured by Nippon Aerosil) was externally added to 100 parts of the resulting toner for developing an electrostatic latent image (4), and the materials were mixed using a Henschel mixer to obtain an externally added toner for developing an electrostatic latent image (4).

<Preparation of Electrostatic Latent Image Developer (4)>

100 Parts of ferrite particles (manufactured by Powder-Tech; average particle diameter 50 μm) and 1 part of a methacrylate resin (manufactured by Mitsubishi Rayon Co., Ltd.; molecular weight 95000) together with 500 parts of toluene were placed into a pressure-type kneader, the materials were mixed at a normal temperature for 15 minutes, a temperature was elevated to 70° C. while the materials were mixed under reduced pressure, toluene was distilled off, this was cooled, and classified using a 105 μm sieve to prepare a ferrite carrier (resin-covering carrier). This ferrite carrier and an externally added toner for developing an electrostatic latent image (4) were mixed to prepare a two-component electrostatic latent image developer (4) having a toner concentration of 7% by mass. Image formation was performed using an electrostatic latent image developer (4) as described above, and image quality was assessed.

Example 11

Preparation of Toner for Developing Electrostatic Latent Image (5)

—Preparation of Aggregated Particles (Aggregation Step)—

| | |
|---|---|
| Resin particle dispersion (5) | 250 Parts |
| Coloring agent dispersion (1) | 40 Parts |
| Releasing agent dispersion (1) | 130 Parts |
| Cationic surfactant (trade name: Kotamine 24P, manufactured by Kao Corporation)s | 5 Parts |
| Ion-exchanged water | 300 Parts |

The above components were placed into a round-type stainless flask, dispersed using a homogenizer (trade name: Ultraturrax T50, manufactured by IKA), and heated to 48° C. in a heating oil bath. After retained at 48° C. for 30 minutes, this was observed with a light microscope, and it was confirmed that aggregated particles having an average particle diameter of about 5.0 μm were formed.

—Preparation of Adhered Particles (Adhesion Step)—

To this aggregated particle dispersion was mildly added 50 parts of a resin particle dispersion (5) as a resin fine particle dispersion, and a temperature of a heating oil bath was elevated, and retained at 51° C. for 1 hour. This was observed with a light microscope, and it was confirmed that aggregated particles having an average particle diameter of about 5.3 μm were formed.

—Fusion of Adhered Particles (Fusion Step)—

To this was added 7 parts of an anionic surfactant (trade name: Neogen SC, manufactured by Dai-ichi Kogyo Seiyaku Co., Ltd.), and the materials were heated to 90° C. while stirring was continued, and retained for 5 hours. Thereafter, after cooled to room temperature at a rate of 40° C./min., the reaction product was filtered, washed with ion-exchanged water well, and dried using a vacuum drier to obtain a toner for developing an electrostatic latent image (5).

An average particle diameter of the resulting toner for developing an electrostatic latent image (5) was 5.6 μm. One part of colloidal silica (trade name: R972, manufactured by Nippon Aerosil) was externally added to 100 parts of the resulting toner for developing an electrostatic latent image (5), and the materials were mixed using a Henschel mixer to obtain an externally added toner for developing an electrostatic latent image (5).

According to the same manner as that of Example 4 except that an externally added toner for developing an electrostatic latent image (5) was used, an electrostatic latent image developer (2) was prepared. Image formation was performed using an electrostatic latent image developer (5) as described above, and image quality was assessed.

Example 12

Preparation of Toner for Developing Electrostatic Latent Image (6)

—Preparation of Aggregated Particles (Aggregation Step)—

| | |
|---|---|
| Resin particle dispersion (6) | 250 Parts |
| Coloring agent dispersion (1) | 40 Parts |
| Releasing agent dispersion (1) | 130 Parts |
| Cationic surfactant (trade name: Kotamine 24P, manufactured by Kao Corporation) | 5 Parts |
| Ion-exchanged water | 300 Parts |

The above components were placed into a round-type stainless flask, dispersed using a homogenizer (trade name: Ultraturrax T50, manufactured by IKA), and heated to 48° C. in a heating oil bath. After retained at 48° C. for 30 minutes, this was observed with a light microscope, and it was confirmed that aggregated particles having an average particle diameter of about 5.0 μm were formed.

—Preparation of Adhered Particles (Adhesion Step)—

To this aggregated particle dispersion was mildly added 50 parts of a resin particle dispersion (6) as a resin fine particle dispersion, and a temperature of a heating oil bath was elevated, and retained at 51° C. for 1 hour. This was observed with a light microscope, and it was confirmed that adhered particles having an average particle diameter of about 5.3 μm were formed.

—Fusion of Adhered Particles (Fusion Step)—

To this was added 7 parts of an anionic surfactant (trade name: Neogen SC, manufactured by Dai-ichi Kogyo Seiyaku Co., Ltd.), the materials were heated to 90° C. while stirring was continued, and retained for 5 hours. Thereafter, cooled to room temperature at a rate of 40° C./min., the reaction product was filtered, washed with ion-exchanged water well, and dried using a vacuum drier to obtain a toner for developing an electrostatic latent image (6).

An average particle diameter of the resulting toner for developing an electrostatic latent image (6) was 5.3 μm. One part of colloidal silica (trade name: R972, manufactured by Aerosil) was externally added to 100 parts of the resulting toner for developing an electrostatic latent image (6), and the materials were mixed using a Henschel mixer to obtain an externally added toner for developing an electrostatic latent image (6).

According to the same manner as that of Example 4 except that an externally added toner for developing an electrostatic latent image (6) was used, an electrostatic latent image developer (6) was prepared. Image formation was performed using an electrostatic latent image developer (6) as described above, and image quality was assessed.

Comparative Example 4

Preparation of Comparative Toner for Developing Electrostatic Latent Image (2)

—Preparation of Aggregated Particles (Aggregation Step)—

| | |
|---|---|
| Comparative resin particle dispersion (2) | 250 Parts |
| Coloring agent dispersion (1) | 40 Parts |
| Releasing agent dispersion (1) | 40 Parts |
| Cationic surfactant (trade name: Sanizol B50, manufactured by Kao Corporation) | 5 Parts |
| Ion-exchanged water | 300 Parts |

The above components were placed into a round-type stainless flask, dispersed using a homogenizer (trade name: Ultraturrax T50, manufactured by IKA), and heated to 49° C. in a heating oil bath. After retained at 49° C. for 20 minutes, this was observed with a light microscope, and it was confirmed that aggregated particles having an average particle diameter of about 5.0 μm were formed.

—Preparation of Adhered Particles (Adhesion Step)—

To this aggregated particle dispersion was mildly added 70 parts of a comparative resin particle dispersion (2) as a resin fine particle dispersion, and a temperature of a heating oil bath was elevated, and retained at 50° C. for 1 hour. This was observed with a light microscope, and it was confirmed that adhered particles having an average particle diameter of about 5.4 μm were formed.

—Fusion of Adhered Particles (Fusion Step)—

To this was added 7 parts of an anionic surfactant (trade name: Neogen SC, manufactured by Dai-ichi Kogyo Seiyaku Co., Ltd), and the materials were heated to 97° C. while stirring was continued, and retained for 5 hours. Thereafter, after cooled to room temperature at a rate of 20° C./min., the reaction product was filtered, washed with ion-exchanged water well, and dried at 40° C. for 10 hours using a vacuum drier to obtain a comparative toner for developing an electrostatic latent image (2).

An average particle diameter of the resulting comparative toner for developing an electrostatic latent image (2) was 5.7 μm. One part of colloidal silica (trade name: R972, manufactured by Nippon Aerosil) was externally added to 100 parts of the resulting comparative toner for developing an electrostatic latent image (2), and the materials were mixed using a Henschel mixer to obtain a comparative externally added toner for developing an electrostatic latent image (2).

According to the same manner as that of Example 4 except that the comparative externally added toner for developing an electrostatic latent image (2) was used, a comparative electrostatic latent image developer (2) was prepared. Image formation was performed using the comparative electrostatic latent developer (2) as described above, and image quality was assessed.

TABLE 2

| | Polyester resin particle synthesis temperature | | Background stain | | |
|---|---|---|---|---|---|
| | Temperature (° C.) | Energy consumption (*1) | Initial (10th paper) | 50,000th paper | Total assessment |
| Toner for developing electrostatic latent image (4) (Example 10) | 50 | a | a | a | a |
| Toner for developing electrostatic latent image (5) (Example 11) | 50 | a | a | a | a |
| Toner for developing electrostatic latent image (6) (Example 12) | 60 | a | a | a | a |
| Comparative toner for developing electrostatic latent image (2) (Comparative Example 4) | 160 | c | b | c (*2) | c |

(*1) Energy consumption was obtained by comparing with a synthesis temperature (150° C. to 200° C.) of polyester resin particles when a tin oxide catalyst was used. The case of less than 70% is "a", and the case of 70% or more is "c".
(*2) Deterioration in charging property due to denaturation of a particle surface with heat is contemplated, depending on heating finely-dividing conditions of a resin.

From results shown in Table 2, the following is clear: That is, electrostatic latent image developers (4) to (6) have fewer particle manufacturing processes as compared with the comparative electrostatic latent image developer (2), and a necessary heating temperature for synthesizing a resin is low. Image quality is excellent in uniformity, and a fog is caused with difficulty. In addition, image quality stability is also better.

In the following Examples, assessment of an electrostatic latent image developer was performed by forming an image using a modified Docu Centre Color 500CP machine manufactured by Fuji Xerox Co., Ltd., and observing image quality (deviation in solid melt) at an initial stage and at 50000th paper with naked eyes. Assessment criteria are as follows.

Assessment Criteria of Image Quality (Deviation in Solid Melting)

a: When a solid part of a fixed image is observed with naked eyes, a luster part and a non-luster part (a part having a low gloss) are not discriminated, or they are uniform, and there is no uncomfortable feeling between a luster part and a non-luster part.

c: Clearly, areas of a luster part and a non-luster part are remarkable, and there is uncomfortable feeling.

Assessment Criteria of Background Stain a: Toner adhesion is not discriminated with naked eyes.

c: Toner stain is remarkable, and there is uncomfortable feeling relative to a color of a paper with naked eyes.

Assessment of a crease fixation strength was performed by the following method: an unfixed solid sample was prepared using a modified Docu Centre Color 500CP machine manufactured by Fuji Xerox Co., Ltd. The solid sample was adjusted so that a mass per unit area of a toner in the solid sample became 0.7 mg to 0.9 mg/cm$^2$. The paper used was ecolor081A4 paper (manufactured by Fuji Xerox Office Supply Co., Ltd.).

As a fixation method, a fixation part of the modified machine was removed and, separately, a fixation bench whose temperature can be controlled was experimentally made, and this was used. Fixation condition was adjusted so that a gloss (luster) of an image after fixation became 30% (75 to 75 degree measurement/3GM-260TYPE: manufactured by Murakami Color Research Laboratory), and a fixed image was obtained.

After the resulting fixed sample was folded into a half, a roll (external shape 600 mm; made of brass) having a weight of about 500 g was rolled on this folded place, a crease of a fixed image was slightly rubbed with a rag, and the lack state of an image was observed.

Assessment was performed by organoleptic assessment according to the following criteria.

a: A crease is formed, but the lack state of an image is absent, or slight.

b: A white subtle crease is seen, and an image is partially lacked.

c: A white band-like crease is remarkable, and a half or more of lack of an image is seen.

Assessment of vinyl chloride adhesion was performed by the following method: the fixed sample prepared for assessment of a crease fixation strength was covered with a flexible vinyl chloride film (DOP plasticizer: 30% addition), a weight of 300 g was loaded per unit area, and this was allowed to stand for 10 hours in a constant temperature bath at 70° C. humidity and 40° C. Thereafter, the covered sample was taken out, and allowed to stand at room temperature for 1 hour.

Then, this vinyl chloride film was peeled off, and the lack state of an image was assessed according to the following criteria.

a: Lack of an image is absent.

c: Lack of an image is present.

The modified Docu Centre Color500CP machine manufactured by Fuji Xerox Co., Ltd. is an apparatus by which the image forming method of the invention can be practiced.

Example 13

Preparation of Resin Particle Dispersion (7)

| | |
|---|---|
| 2-Methylene-1,3-dioxepane | 200 Parts |
| Butyl acrylate | 200 Parts |
| Acrylic acid | 20 Parts |
| AIBN (azobisisobutyronitrile) | 10 Parts |

The above components (all manufactured by Wako Pure Chemical Industries, Ltd.) were mixed and dissolved, this was dispersed into a solution in which 8 parts of a nonionic surfactant (trade name: Nonipol 85, manufactured by Sanyo Chemical Industries, Ltd.) and 10 parts of an anionic surfactant (trade name: Neogen SC, manufactured by Dai-ichi Kogyo Seiyaku Co., Ltd.) had been dissolved in 582 parts of ion-exchanged water, in a flask, the dispersion was emulsified so that an average particle diameter became 1 μm, nitrogen replacement was performed, and this was polymerized at a reaction temperature of 70° C. for 7 hours to prepare a resin particle dispersion (7).

Example 14

Preparation of Resin Particle Dispersion (8)

| | |
|---|---|
| 2-Methylene-1,3-dioxolane | 200 Parts |
| Styrene | 200 Parts |
| Butyl acrylate | 50 Parts |
| Acrylic acid | 10 Parts |
| AIBN | 10 Parts |

The above components (all manufactured by Wako Pure Chemical Industries, Ltd.) were mixed and dissolved, this was dispersed in a solution in which 8 parts of a nonionic surfactant (trade name: Nonipol 85, manufactured by Sanyo Chemical Industries, Ltd.) and 10 parts of an anionic surfactant (trade name: Neogen SC, manufactured by Dai-ichi Kogyo Seiyaku Co., Ltd.) had been dissolved in 582 parts of ion-exchanged water, in a flask, the dispersion was emulsified so that an average particle diameter became 1 μm, nitrogen replacement was performed while the materials were slowly mixed for 10 minutes, the content was heated to 70° C. in an oil bath while the interior of the flask was stirred, and emulsion polymerization was continued as it was for 7 hours to prepare a resin particle dispersion (8).

Example 15

Preparation of Resin Particle Dispersion (9)

| | |
|---|---|
| 2-Methylene-1,3-dioxepane | 100 Parts |
| Styrene | 250 Parts |
| N-butyl acrylate | 30 Parts |
| Acrylic acid | 8 Parts |
| Dodecanethiol | 24 Parts |
| Carbon tetrabromide | 4 Parts |

The above components were mixed and dissolved, this was dispersed in a solution in which 6 g of a nonionic surfactant (trade name: Nonipol400, manufactured by Sanyo Chemical Industries, Ltd.) and an anionic surfactant (trade name: Neogen SC, manufactured by Dai-ichi Kogyo Seiyaku Co., Ltd.) had been dissolved in 550 g of ion-exchanged water, in a flask, this was emulsified, 50 g of ion-exchanged water in which 4 g of ammonium persulfate had been dissolved was placed therein while the materials were mixed slowly for 10 minutes, nitrogen replacement was performed, this was heated with the oil bath, and emulsion polymerization was continued as it was for 7 hours to prepare a resin particle dispersion (9).

Comparative Example 5

Preparation of Comparative Resin Particle Dispersion (3)

| | |
|---|---|
| Styrene | 100 Parts |
| Butyl acrylate | 100 Parts |
| Acrylic acid | 4 Parts |
| AIBN | 10 Parts |

The above components (all manufactured by Wako Pure Chemical Industries, Ltd.) were mixed and dissolved, this was dispersed in a solution in which 8 parts of a nonionic surfactant (trade name: Nonipol 85, manufactured by Sanyo Chemical Industries, Ltd.) and 10 parts of an anionic surfactant (trade name: Neogen SC, manufactured by Dai-ichi Kogyo Seiyaku Co., Ltd.) had been dissolved in 582 parts of ion-exchanged water, this was emulsified with a rotor stator type homogenizer (trade name: Ultraturrax, manufactured by IKA) so that an average particle diameter became 1 μm or smaller. Thereafter, nitrogen replacement was performed while the materials were mixed slowly for 10 minutes, the content was heated to 70° C. in an oil bath while the interior of the flask was stirred, and emulsion polymerization was continued as it was for 7 hours to prepare a comparative resin particle dispersion (3).

Example 16

Preparation of Toner for Developing Electrostatic Latent Image (7)

—Preparation of Aggregated Particles (Aggregation Step)—

| | |
|---|---|
| Resin particle dispersion (7) | 240 Parts |
| Coloring agent dispersion (1) | 40 Parts |
| Releasing agent dispersion (1) | 100 Parts |
| Cationic surfactant (trade name: Sanizol B50, manufactured by Kao Corporation) | 2 Parts |
| Ion-exchanged water | 300 Parts |

The above components were placed into a round-type stainless flask, dispersed using a homogenizer (trade name: Ultraturrax T50, manufactured by IKA), and heated to 47° C. in a heating oil bath. After retained at 47° C. for 30 minutes, this was observed with a light microscope, and it was confirmed that aggregated particles having an average particle diameter of about 5.1 μm were formed.

—Preparation of Adhered Particles (Adhesion Step)—

To this aggregated particle dispersion was mildly added 50 parts of a resin particle dispersion (7) as a resin fine particle dispersion, and a temperature of a heating oil bath was elevated, and retained at 48° C. for 1 hour. This was observed with a light microscope, and it was confirmed that adhered particles having an average particle diameter of about 5.5 μm were formed.

—Fusion of Adhered Particles (Fusion Step)—

To this was added 6 parts of an anionic surfactant (trade name: Neogen SC, manufactured by Dai-ichi Kogyo Seiyaku Co., Ltd.), and the materials were heated to 94° C. while stirring was continued, and retained for 5 hours. Thereafter, after cooled at a rate of 10° C./min, the reaction product was filtered, washed with ion-exchanged water well, and dried using a vacuum drier to obtain a toner for developing an electrostatic latent image (7).

An average particle diameter of the resulting toner for developing an electrostatic latent image (7) was 5.7 μm. One part of colloidal silica (trade name: R972, manufactured by Aerosil) was externally added to 100 parts of the resulting toner for developing an electrostatic latent image (7), the materials were mixed using a Henschel mixer to obtain an externally added toner for developing an electrostatic latent image (7).

<Preparation of Electrostatic Latent Image Developer (7)>

100 Parts of ferrite particles (manufactured by Powdertech; average particle diameter 50 μm) and 1 part of a methacrylate resin (manufactured by Mitsubishi Rayon Co., Ltd.; molecular weight 95000) together with 500 parts of toluene were placed into a pressure-type kneader, mixed at a normal temperature for 15 minutes, a temperature was elevated to 70° C. while the materials were mixed under reduced pressure to distil off toluene, and this was cooled, and classified using a 105 μm sieve to prepare a ferrite carrier (resin-covering carrier). This ferrite carrier and an externally added toner for developing an electrostatic latent image (7) were mixed to prepare a two-component electrostatic latent image developer (7) having a toner concentration of 7% by mass. An image was formed using the electrostatic latent image developer (7) as described above, and assessment was performed.

Example 17

Preparation of Toner for Developing Electrostatic Latent Image (8)

—Preparation of Aggregated Particles (Aggregation Step)—

| | |
|---|---|
| Resin particle dispersion (8) | 250 Parts |
| Coloring agent dispersion (1) | 40 Parts |
| Releasing agent dispersion (1) | 130 Parts |
| Cationic surfactant (trade name: Kotamine 24P, manufactured by Kao Corporation) | 5 Parts |
| Ion-exchanged water | 300 Parts |

The above components were placed into a round-type stainless flask, dispersed using a homogenizer (trade name: Ultraturrax T50, manufactured by IKA), and heated to 48° C. in a heating oil bath. After retained at 48° C. for 30 minutes, this was observed with a light microscope, and it was confirmed that aggregated particles having an average particle diameter of about 5.0 μm were formed.

—Preparation of Adhered Particles (Adhesion)—

To this aggregated particle dispersion was mildly added 50 parts of a resin particle dispersion (8) as a resin fine particle dispersion, and a temperature of a heating oil bath was elevated, and retained at 51° C. for 1 hour. This was observed with a light microscope, and it was confirmed that adhered particles having an average particle diameter of about 5.3 μm were formed.

—Fusion of Adhered Particles (Fusion Step)—

To this was added 7 parts of an anionic surfactant (trade name: Neogen SC, manufactured by Dai-ichi Kogyo Seiyaku Co., Ltd.), and the materials were heated to 90° C. while stirring was continued, and retained for 5 hours. Thereafter, after cooled to room temperature at a rate of 40° C./min., the reaction product was filtered, washed with ion-exchanged water well, and dried using a vacuum drier to obtain a toner for developing an electrostatic latent image (8).

An average particle diameter of the resulting toner for developing an electrostatic latent image (8) was 5.6 μm. One part of colloidal silica (trade name: R972, manufactured by Aerosil) was externally added to 100 parts of the resulting toner for developing an electrostatic latent image (8), and the materials were mixed using a Henschel mixer to obtain an externally added toner for developing an electrostatic latent image (8).

According to the same manner as that of Example 4 except that the externally added toner for developing an electrostatic latent image (8) was used, an electrostatic latent image developer (8) was prepared. An image was formed using the electrostatic latent image developer (8) as described above, and assessment was performed.

Example 18

Preparation of Toner Developing of Electrostatic Latent Image (9)

—Preparation of Aggregated Particles (Aggregation Step)—

| | |
|---|---|
| Resin particle dispersion (9) | 250 Parts |
| Coloring agent dispersion (1) | 40 Parts |
| Releasing agent dispersion (1) | 130 Parts |
| Cationic surfactant (trade name: Kotamine 24P manufactured by Kao Corporation) | 5 Parts |
| Ion-exchanged water | 300 Parts |

The above components were placed into a round-type stainless flask, dispersed using a homogenizer (trade name: Ultraturrax T50, manufactured by IKA), and heated to 48° C. in a heating oil bath. After retained at 48° C. for 30 minutes, this was observed with a light microscope, and it was confirmed that aggregated particles having an average particle diameter of about 5.0 μm were formed.

—Preparation of Adhered Particles (Adhesion Step)

To this aggregated particle dispersion was mildly added 50 parts of a resin particle dispersion (9) as a resin fine particle dispersion, and a temperature of a heating oil bath was elevated, and retained at 51° C. for 1 hour. This was observed with a light microscope, and it was confirmed that adhered particles having an average particle diameter of about 5.3 μm were formed.

—Fusion of Adhered Particles (Fusion Step)—

To this was added 7 parts of an anionic surfactant (trade name: Neogen SC, manufactured by Dai-ich Kogyo Seiyaku Co., Ltd.), and the materials were heated to 90° C. while stirring was continued, and retained for 5 hours. Thereafter, after cooled to room temperature at a rate of 40° C./min., the reaction produce was filtered, washed with ion-exchanged water well, and dried using a vacuum drier to obtained a toner for developing an electrostatic latent image (9).

An average particle diameter of the resulting toner for developing an electrostatic latent image (9) was 5.3 μm. One part of colloidal silica (trade name: R972, manufactured by Nippon Aerosil) was externally added to 100 parts of the resulting toner for developing an electrostatic latent image (9), and the materials were mixed using a Henschel mixer to obtain an externally added toner for developing an electrostatic latent image (9).

According to the same manner as that of Example 4 except that the externally added toner for developing an electrostatic latent image (9) was used, an electrostatic latent image developer (9) was prepared. An image was formed using the electrostatic latent image developer (9) as described above, assessment was performed.

Comparative Example 6

Preparation of Comparative Toner for Developing Electrostatic Latent Image (3)

—Preparation of Aggregated Particles (Aggregation Step)—

| | |
|---|---|
| Comparative resin particle dispersion (3) | 250 Parts |
| Coloring agent dispersion (1) | 40 Parts |
| Releasing agent dispersion (1) | 40 Parts |
| Cationic surfactant (trade name: Sanizol B50, manufactured by Kao Corporation) | 5 Parts |
| Ion-exchanged water | 300 Parts |

The above components were placed into a round-type stainless flask, dispersed using a homogenizer (trade name: Ultraturrax T50, manufactured by IKA), and heated to 49° C. in a heating oil bath. After retained at 49° C. for 20 minutes, this was observed with a light microscope, and it was confirmed that aggregated particles having an average particle diameter of about 5.0 μm were formed.

—Preparation of Adhered Particles (Adhesion Step)

To this aggregated particle dispersion was mildly added 70 parts of a comparative resin particle dispersion (3) as a resin fine particle dispersion, and a temperature of a heating oil bath was elevated, and retained at 50° C. for 1 hour. This was observed with a light microscope, and it was confirmed that aggregated particles having an average particle diameter of about 5.4 μm were formed.

—Fusion of Adhered Particles (Fusion Step)—

To this was added 7 parts of an anionic surfactant (trade name: Neogen SC, manufactured by Dai-ichi Kogyo Seiyaku Co., Ltd.), and the materials were heated to 97° C. while stirring was continued, and retained for 5 hours. Thereafter, after cooled to room temperature at a rate of 20° C./min., the reaction product was filtered, washed with ion-exchanged water well, and dried at 40° C. for 10 hours using a vacuum drier to obtain a comparative toner for developing an electrostatic latent image (3).

An average particle diameter of the resulting comparative toner for developing an electrostatic latent image (3) was 5.7 μm. One part of colloidal silica (trade name: R972, manufactured by Nippon Aerosil) was externally added to 100 parts of the resulting comparative toner for developing an electrostatic latent image (3), and the materials were mixed using a Henschel mixer to obtain a comparative externally added toner for developing an electrostatic latent image (3).

According to the same manner as that of Example 4 except that the comparative externally added toner for developing an electrostatic latent image (3), a comparative electrostatic latent image developer (3) was prepared. An image was formed using the comparative electrostatic latent image developer (3) as described above, and assessment was formed.

TABLE 3

| | Image quality assessment (deviation in solid melting) | | Background stain | | | |
|---|---|---|---|---|---|---|
| | Initial (10th paper) | 50,000th paper | Initial (10th paper) | 50,000th paper | Fixation strength | Vinyl chloride adherability |
| Toner for developing electrostatic latent image (7) (Example 16) | a | a | a | a | a | a |
| Toner for developing electrostatic latent image (8) (Example 17) | a | a | a | a | a | a |
| Toner for developing electrostatic latent image (9) (Example 18) | a | a | a | a | a | a |
| Comparative toner for developing electrostatic latent image (3) (Comparative Example 6) | c | c | a | c | c | c |

From results shown in Table 3, the following is clear. That is, the electrostatic latent image developers (7) to (9) have little deviation in solid melting, are excellent in uniformity, and cause a fog with difficulty in image quality as compared with the comparative electrostatic latent image developer (3). In addition, they are better also in image quality stability, and vinyl chloride adherability resistance.

What is claimed is:

1. A method of producing resin particles comprising:

an emulsification step of emulsifying a composition containing at least a polymerizable monomer and a polymerization catalyst to form droplets of the composition, wherein the composition contains a polyester resin, lactone, and a lactone polymerization catalyst for polymerizing the lactone; and a polymerization step of polymerizing the polymerizable monomer in the droplets to synthesize resin particles that includes at least a lactone polymerization step of polymerizing the lactone in the droplets of the composition to synthesize a polyester resin.

2. The method of claim 1, wherein the lactone polymerization catalyst is a Lewis acid catalyst containing a rare earth element as a constitutional element.

3. The method of claim 2, wherein the Lewis acid catalyst containing the rare earth element as a constitutional element is rare earth metal triflate represented by the following formula:

$$X(OSO_2CF_3)_3$$

(wherein X represents a rare earth element).

4. The method of claim 1, wherein the lactone polymerization catalyst is an enzyme catalyst.

5. The method of claim 1, wherein the polymerization step polymerizes the lactone in the droplets of the composition to form a polyester resin.

6. Resin particles produced by the method of claim 1.

7. Resin particles according to claim 6, wherein the average particle diameter is 1 μm or smaller.

8. A method of producing a toner for developing an electrostatic latent image comprising:

an aggregation step of mixing a resin particle dispersion in which the resin particles as defined in claim 6 are dispersed, a coloring agent dispersion in which a coloring agent is dispersed, and a releasing agent dispersion in which a releasing agent is dispersed, to form aggregated particles containing resin particles, a coloring agent, and a releasing agent, to obtain an aggregated particle dispersion, and a fusion step of heating and fusing the aggregated particles.

9. The method of claim 8, wherein the process further comprises an adhesion step of adding a fine particle dispersion in which fine particles are dispersed to the aggregated particle dispersion, mixing them, and adhering the fine particles to the aggregated particles to form adhered particles, after the aggregation step and before the fusing step.

10. The method of claim 9, wherein the addition and mixing is performed stepwise a plural number of times.

11. The method of claim 8, wherein the process further comprises a cooling step after the fusing step.

12. The method of claim 8, wherein the releasing agent comprises at least one of a higher alcohol of a carbon number of 12 to 30 and a higher fatty acid of a carbon number of 12 to 30.

13. A toner for developing an electrostatic latent image prepared by the method of claim 8.

14. An electrostatic latent image developer comprising at least the toner for developing an electrostatic latent image as defined in claim 13.

15. An image forming method comprising:

a latent image forming step of forming an electrostatic latent image on a latent image bearing body surface, a developing step of developing the electrostatic latent image formed on the latent image bearing body surface using a developer carried in a developer carrier to form a toner image, a transference step of transferring the toner image formed on the latent image bearing body surface onto a surface of a body receiving the transfer, and a fixation step of thermally fixing the toner image transferred onto the surface of the body receiving the transfer, wherein the developer is the electrostatic latent image developer as defined in claim 14.

16. The image forming method according to claim 15, wherein the method further comprises a cleaning step of recovering a remaining toner on the latent image bearing body surface, and a recycle step of conveying the remaining toner recovered in the cleaning step to the developer carrier, after the transference step.

* * * * *